United States Patent
Anderson et al.

(10) Patent No.: US 8,452,323 B2
(45) Date of Patent: May 28, 2013

(54) METHOD AND SYSTEM FOR SELECTING A THERMALLY OPTIMAL UPLINK FOR A PORTABLE COMPUTING DEVICE

(75) Inventors: Jon J. Anderson, Boulder, CO (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/313,787

(22) Filed: Dec. 7, 2011

(65) Prior Publication Data

US 2013/0078977 A1   Mar. 28, 2013

Related U.S. Application Data

(60) Provisional application No. 61/537,915, filed on Sep. 22, 2011.

(51) Int. Cl.
*H04B 7/00* (2006.01)

(52) U.S. Cl.
USPC ........... 455/522; 455/126; 455/103; 455/418; 370/254; 370/252; 370/468; 340/870.17; 340/539.27; 340/584

(58) Field of Classification Search
USPC ............. 455/553.1, 574, 436, 412.1, 432.1, 455/466, 515, 522, 126, 403, 103; 370/310, 370/338, 331, 401, 311, 229, 254, 431, 252, 370/468; 709/230, 219, 250, 227, 217; 385/39; 340/870.17, 539.27, 584
See application file for complete search history.

(56) References Cited

U.S. PATENT DOCUMENTS

| | | | |
|---|---|---|---|
| 6,622,251 B1 * | 9/2003 | Lindskog et al. | 713/300 |
| 6,760,311 B1 | 7/2004 | Raith | |
| 7,146,176 B2 * | 12/2006 | McHenry | 455/454 |
| 2001/0044588 A1 | 11/2001 | Mault | |
| 2004/0160901 A1 * | 8/2004 | Raith | 370/252 |
| 2007/0030820 A1 * | 2/2007 | Sarkar et al. | 370/315 |
| 2007/0132607 A1 * | 6/2007 | Nagano | 340/870.17 |
| 2007/0241261 A1 | 10/2007 | Wendt et al. | |
| 2008/0025341 A1 * | 1/2008 | Rao et al. | 370/468 |
| 2008/0069028 A1 * | 3/2008 | Richardson | 370/328 |
| 2008/0150698 A1 | 6/2008 | Smith et al. | |
| 2009/0069642 A1 | 3/2009 | Gao et al. | |
| 2009/0290625 A1 * | 11/2009 | Riddle et al. | 375/222 |
| 2010/0091747 A1 * | 4/2010 | Dorsey et al. | 370/338 |
| 2010/0136998 A1 * | 6/2010 | Lott et al. | 455/453 |
| 2011/0199383 A1 * | 8/2011 | Anderson et al. | 345/581 |
| 2012/0260258 A1 * | 10/2012 | Regini et al. | 718/104 |

OTHER PUBLICATIONS

International Search Report and Written Opinion—PCT/US2012/053348—ISA/EPO—Jan. 3, 2013.

* cited by examiner

*Primary Examiner* — Mahendra Patel
(74) *Attorney, Agent, or Firm* — Nicholas A. Cole

(57) ABSTRACT

A method and system for selecting a thermally optimal airlink for a portable computing device includes monitoring a temperature of the portable computing device as well as determining if the portable computing device has reached a threshold temperature range. Next, an estimated volume of data to be sent over one or more airlinks may be calculated in addition to determining an estimated duration for the data using one or more airlinks. A quality of service needed for the data in connection with the one or more airlinks may be determined. With this estimated data, one or more available airlinks for the data to be transmitted may be compared. After this comparison, one or more thermally optimal airlinks may be selected based on the estimated volume, estimated data rate, and estimated duration. Determining if the portable computing device is proximate to an operator may be used when considering airlinks.

32 Claims, 10 Drawing Sheets

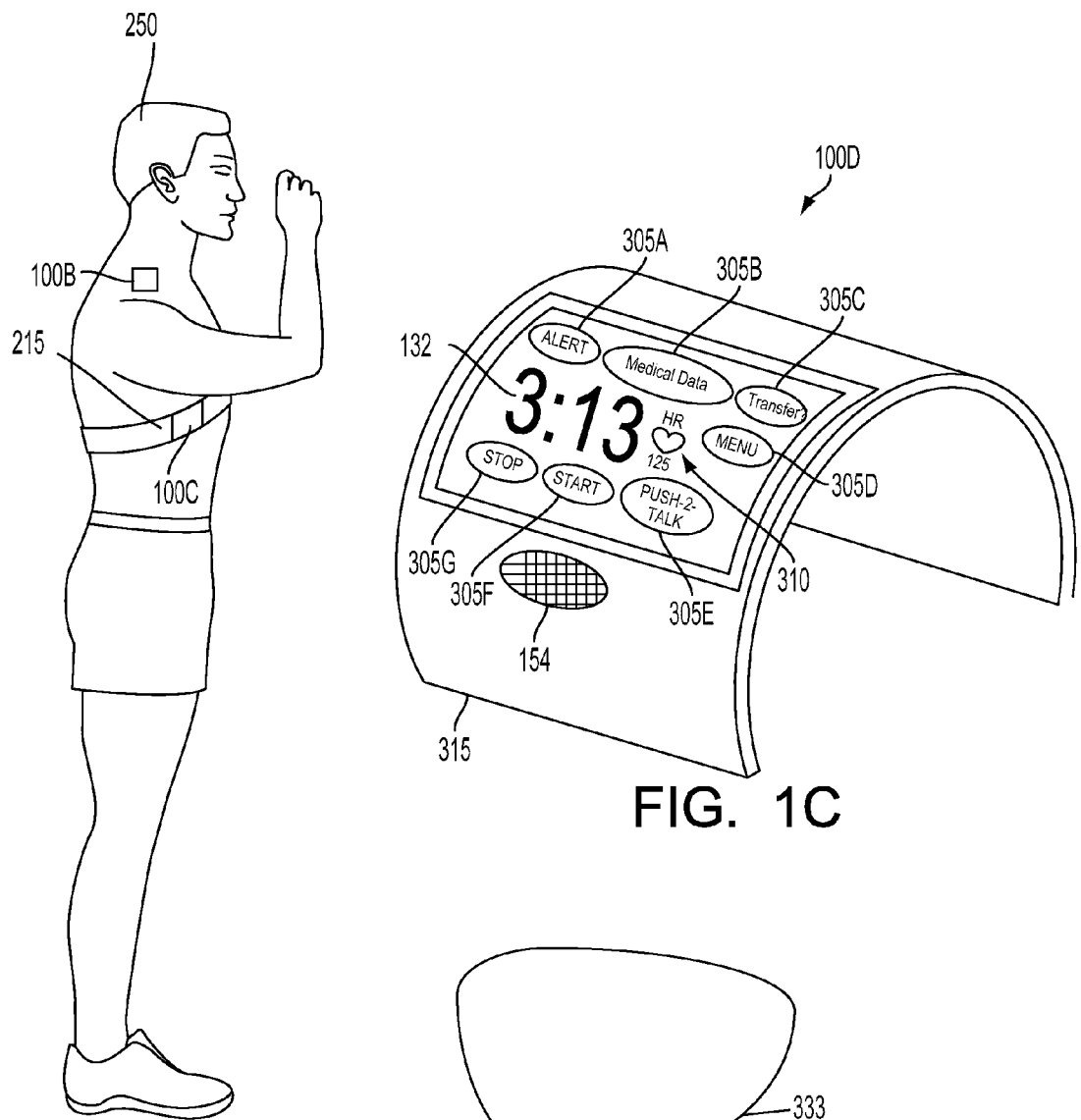
FIG. 1B
FIG. 1C
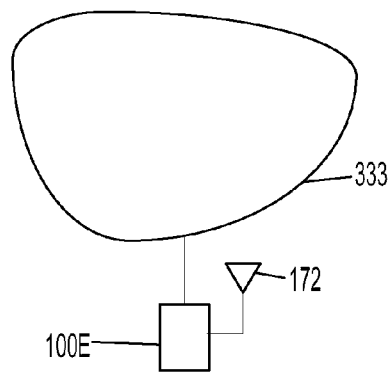
FIG. 1D

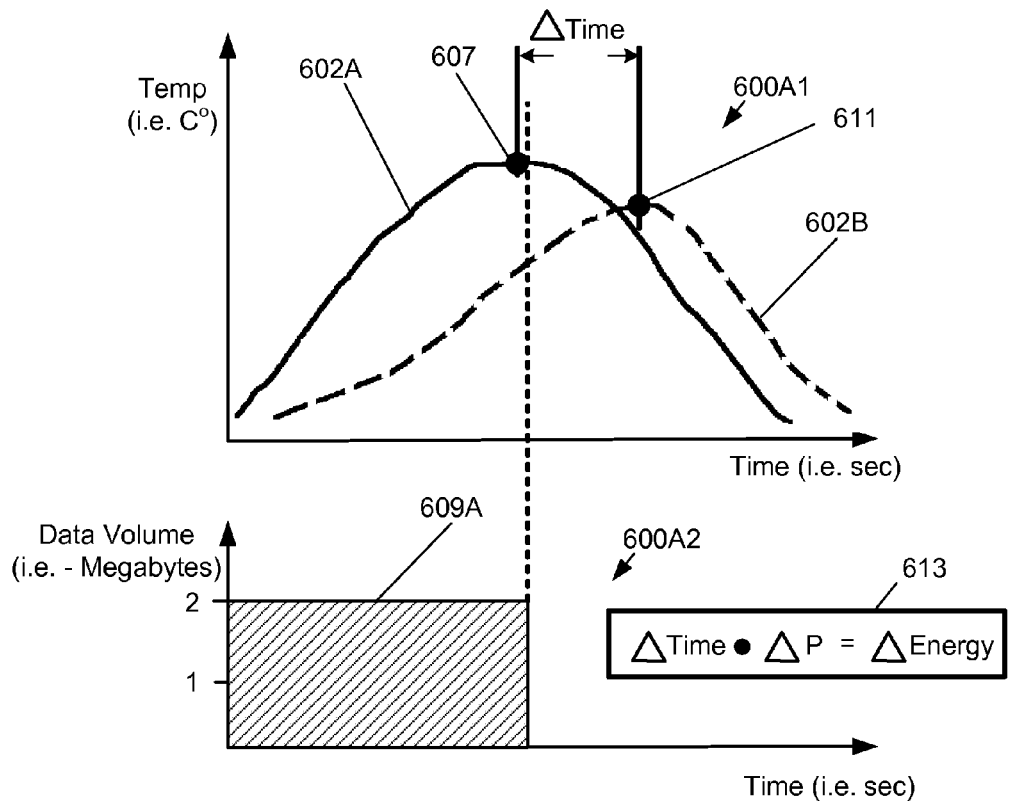
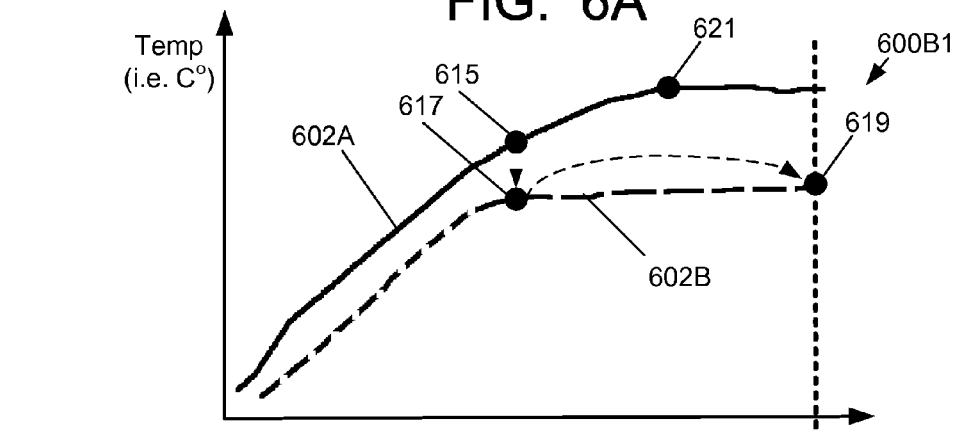
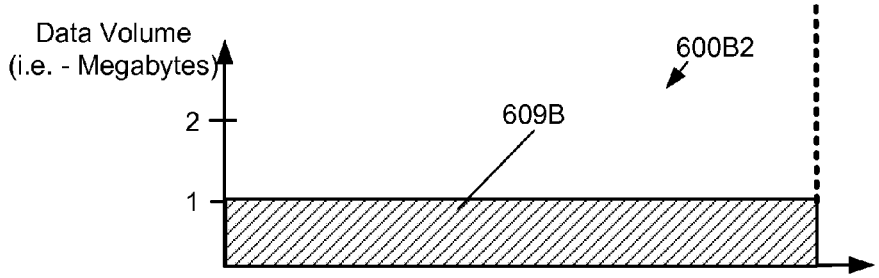
FIG. 6A
FIG. 6B

PREDICTIVE TABLES BASED ON TRANSMISSION HISTORY

800A

|  | Time Slot 1 Second | Time Slot 2 Seconds | Time Slot 3 Seconds | Time Slot 4 Seconds |
|---|---|---|---|---|
| 2 kilobits / sec. | 10% | 5% | 2% | 0 |
| 5 kilobits / sec. | 60% | 45% | 10% | 0 |
| 10 kilobits / sec. | 20% | 50% | 88% | 100% |

800B

|  | Time Slot 1 Second | Time Slot 2 Seconds | Time Slot 3 Seconds | Time Slot 4 Seconds |
|---|---|---|---|---|
| 2 kilobits / sec. | 10% | 10% | 2% | 33% |
| 5 kilobits / sec. | 20% | 65% | 8% | 33% |
| 10 kilobits / sec. | 70% | 25% | 90% | 34% |

800C

|  | Time Slot 1 Second | Time Slot 2 Seconds | Time Slot 3 Seconds | Time Slot 4 Seconds |
|---|---|---|---|---|
| 2 kilobits / sec. | 0 | 0 | 0 | 0 |
| 5 kilobits / sec. | 0 | 0 | 0 | 0 |
| 10 kilobits / sec. | 100% | 100% | 100% | 100% |

FIG. 8

METHOD AND SYSTEM FOR SELECTING A THERMALLY OPTIMAL UPLINK FOR A PORTABLE COMPUTING DEVICE

STATEMENT REGARDING RELATED APPLICATIONS

This patent application claims priority under 35 U.S.C. §119(e) to U.S. Provisional Patent Application Ser. No. 61/537,915, filed on Sep. 22, 2011, entitled, "Method and system for selecting a thermally optimal uplink for a portable computing device," the entire contents which are hereby incorporated by reference.

DESCRIPTION OF THE RELATED ART

"portable computing device," ("PCD") as the term is used herein, is a portable or mobile device that is capable of communicating data with a wireless network by means of radio frequency ("RF") transmission. PCDs may include cellular telephones, portable digital assistants ("PDAs"), portable game consoles, laptop computers, tablet personal computers ("PCs"), palmtop computers, devices embedded within humans or animals, such as medical information transmitters or pet tags, and other portable electronic devices.

A PCD includes a number of electronic subsystems, one of which is the air interface or airlink subsystem. The term "air interface" or "airlink" refers to a communication link with another system that is established wirelessly, i.e., over the air, in accordance with a specific standard or protocol. Examples of such airlinks include but are not limited to: Wideband Code-Division Multiple Access ("W-CDMA"); Evolution Data-Only ("EVDO"); Global System for Mobile telecommunications ("GSM") and its data service extensions such as Enhanced Data Rates for GSM Evolution ("EDGE") and General Packet Radio Service ("GPRS"); Long-Term Evolution ("LTE"), wireless fidelity ("Wi-Fi"™) brand of IEEE 802.11 wireless LAN ("WLAN") systems, BLUETOOTH™ brand of proprietary open wireless systems, high speed packet access ("HSPA"), data only ("DO"), one-times radio transmission technology ("1xRTT") or ("1x") or otherwise known as "CDMA 200 1x", ZigBee™ brand IEEE 802 standard personal area networks, and other similar wireless systems.

The term "uplink" refers to a wireless communication link, such as an airlink, in which the PCD originates the wireless communication and is uploading data to a communications network. Different airlinks are not compatible with one another. That is, a PCD and a base station cannot communicate unless both are configured for the same airlink.

The airlink subsystem includes RF transceiver circuitry and signal processing circuitry. The signal processing circuitry performs processes such as upconverting and downconverting the RF signal to and from radio frequencies and controlling signal modulation, demodulation and coding that together characterize the RF signal. Some of the signal processing is typically performed in the analog domain, and other portions in the digital domain (e.g., by a programmable processor under control of software or firmware).

The term "multi-mode PCD" as used herein refers to a PCD that includes reconfigurable processing elements (which may include hardware, software or a combination thereof) in the airlink subsystem that allow the airlink to be changed during operation of the PCD. That is, the PCD may at times communicate via one airlink and at other times communicate via a different airlink. The airlink can be switched by a processor in response to changing operating conditions. For example, a multi-mode PCD can facilitate roaming between two geographic regions in which a single airlink is not available through service providers in both regions.

Thus, when a multi-mode PCD is operating in a first such region, it communicates via a first airlink, and when the multi-mode PCD is operating in a second such region, it communicates via a second airlink. For example, consider an instance in which W-CDMA airlink service is provided in a first geographic region but LTE airlink service is not provided in the first region, while LTE airlink service is provided in a second geographic region but W-CDMA airlink service is not provided in the second geographic region. A dual-mode PCD that is capable of switching between W-CDMA and LTE modes can switch to the W-CDMA mode when the PCD is roaming in the first region and switch to LTE mode when the PCD is roaming in the second region. The terms "airlink," "mode" and "airlink mode" are used synonymously herein.

Some airlinks feature operating parameters that can be changed dynamically in the PCD. For example, some airlinks allow the PCD to change the rate at which it transmits information. Data service enhancements such as EDGE and GPRS feature rate adaptation algorithms that adapt the modulation and coding scheme according to the quality of the radio channel, and thus the bit rate and robustness of data transmission. Thus, if the processor determines that channel quality is high, the processor can adjust the modulation and coding scheme or other operating parameters to take advantage of the high channel quality to maximize information throughput.

Conversely, if the processor determines that channel quality is low, the processor can adjust the modulation and coding scheme or other operating parameters to maximize information integrity. Such adjustments are sometimes referred to as Quality of Service (QoS) adjustments. It has also been suggested to adjust operating parameters of an airlink for the purpose of conserving power.

In operation, the electronic circuitry within a PCD generates heat, which at excessive levels may be detrimental to the circuitry. The amount of heat that is generated may vary depending upon the operating conditions. For example, a PCD transmitting data for a sustained time period at a high power level may generate a large amount of heat. Some PCDs include thermal sensors that a processor may monitor to determine if the PCD has reached a threshold or critical temperature above which the electronic circuitry may be harmed. It has been suggested that, when a reading of the thermal sensor indicates that a PCD has reached such a threshold temperature, the processor may adjust operating parameters of an airlink to attempt to reduce the amount of heat that is generated.

One problem in the art is that a PCD will typically transmit data over an uplink that is currently open, irrespective if other airlinks are available and which may be more efficient from a thermal perspective. Another problem for PCDs is that they usually do not have any active cooling devices, like fans or the like. Accordingly, there is a need in the art for a PCD which can switch between airlinks or uplinks that may be more thermally efficient for the PCD.

SUMMARY OF THE DISCLOSURE

A method and system for selecting a thermally optimal airlink for a portable computing device includes monitoring a temperature of the portable computing device as well as determining if the portable computing device has reached a threshold temperature range. Next, an estimated volume of data to be sent over one or more airlinks may be calculated in addition to determining an estimated duration for the data using one or more airlinks. A quality of service needed for the data in connection with the one or more airlinks may be determined. With this estimated data, one or more available airlinks for the data to be transmitted may be compared. After this comparison, one or more thermally optimal airlinks may be selected based on the estimated volume, estimated data rate, and estimated duration. Determining if the portable computing device is proximate to an operator may be used when considering airlinks.

If the portable computing device is proximate to the operator, then output power of a selected airlink may be adjusted such that the portable computing device radiates at safe levels relative to the operator. The system and method may determine if an airlink override condition exists for an application program currently using an existing airlink. The method and system may further include switching a current airlink to the identified one or more thermally optimal airlinks, the one or more thermally optimal airlinks lowering a thermal load of the portable computing device while maintaining a desired quality of service for the data.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 1B is an illustration of a PCD for medical use which may be embedded in a human body or worn on the human body;

FIG. 1C is an illustration of a PCD for medical use that is in the form of a bracelet that is worn on an extremity of the human body;

FIG. 1D is an illustration of a PCD for medical use that is in the form of a unit which may be worn on the human body;

FIG. 6A is an illustration that includes two graphs: a first graph which plots theoretical values of Time vs. Temperature for two different airlinks and second graph which plots an estimated Time vs. data volume;

FIG. 6B is an illustration that includes two graphs: a first graph which plots theoretical values of Time vs. Temperature for two separate airlinks and second graph which plots an estimated Time vs. data volume;

FIG. 8 is an illustration that includes a plurality of predictive tables that estimate data volumes over various segments of time, such as seconds.

DETAILED DESCRIPTION

The word "exemplary" or "illustrative" is used herein to mean "serving as an example, instance, or illustration." Any aspect described herein as "exemplary" or "illustrative" is not necessarily to be construed as preferred or advantageous over other aspects.

In this description, the terms "communication device," "PCD," "wireless telephone," "wireless communication device" and "wireless handset" are used interchangeably. With the advent 3G and 4G wireless technology, greater bandwidth availability has enabled more portable computing devices with a greater variety of wireless capabilities. Therefore, a PCD could be a cellular telephone, a smartphone, a satellite telephone, a pager, a personal digital assistant ("PDA"), a navigation device, a smartbook or reader, a media player, an embedded medical device, a medical device which may be worn on a person, or a computer with a wireless connection.

In this description, the term "application" in the context of software may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein may also include files that are not executable in nature, such as documents that may need to be opened or other data files that need to be accessed.

As used in this description, the terms "component," "database," "module," "system," and the like are intended to refer to a computer-related entity or element, either hardware, firmware, a combination of hardware and software, software, or software in execution. For example, a component may be, but is not limited to being, a processor, a process running on a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1A:
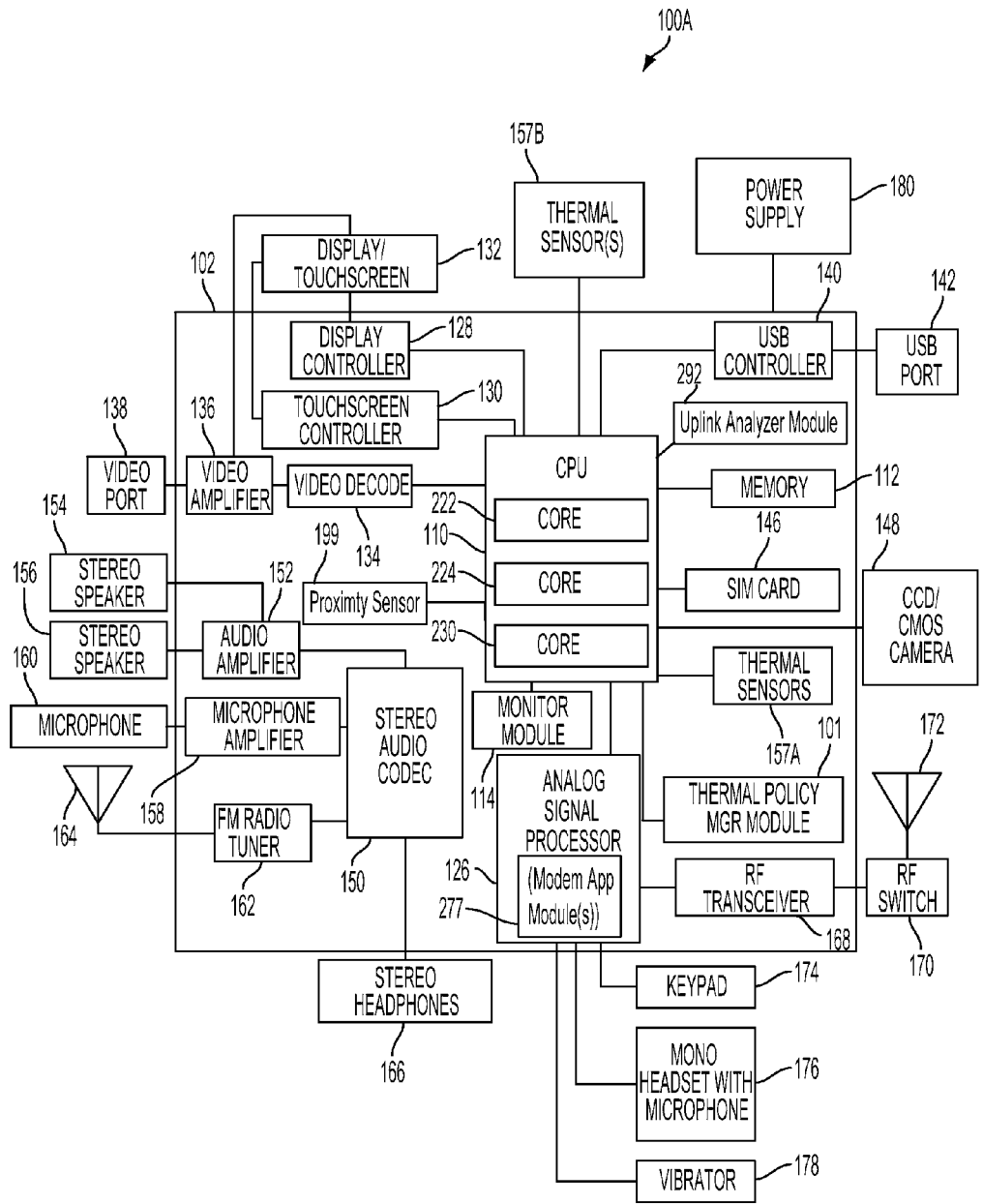
FIG. 1A is a functional block diagram illustrating an exemplary embodiment of a multi-mode PCD.

In FIG. 1A, an exemplary multi-mode PCD 100A in the form of a wireless telephone or handset in which methods and systems for temperature-driven airlink selection are implemented is illustrated through an exemplary, non-limiting functional block diagram. The PCD 100A of FIG. 1A does not have any active cooling devices, like fans or the like.

As shown, the multi-mode PCD 100A includes an on-chip system 102 that includes a multi-core central processing unit ("CPU") 110 and an analog signal processor 126 that are coupled together. The CPU 110 may comprise one or more cores 222, 224, 230, etc. The cores 222, 224, 230, etc., may be integrated on a single integrated circuit die, or in other embodiments they may be integrated or coupled on separate dies in a multiple-circuit package. The cores 222, 224, 230, etc., may be coupled via one or more shared caches, and they may implement message or instruction passing via network topologies such as bus, ring, mesh and crossbar topologies. In other embodiments, instead of a CPU 110A a digital signal processor ("DSP") may also be employed, as understood by one of ordinary skill in the art.

As understood by one of ordinary skill in the art, the above-described electronic elements and others produce heat during operation. Excessive heat may be detrimental to the electronic elements of multi-mode PCD 100A. The multi-mode PCD 100 is capable of operating in any selected one of two or more airlink modes. Operation in some of the airlink modes produces more heat than operation in others of the airlink modes. For example, the multi-mode PCD 100A may be capable of operating at times in W-CDMA mode and at other times in LTE mode, and it is known that operation in LTE mode produces, on average, more heat than operation in W-CDMA mode, due to the more intensive computational processing (e.g., coding) that the CPU 110 performs when the multi-mode PCD 100A is operating in LTE mode.

The amount of heat produced by the multi-mode PCD 100A is related to the amount of power it consumes. Therefore, the phrase "more power intensive" (or, equivalently, "less power efficient") may be used herein to describe a mode in which the multi-mode PCD 100 generates more heat than in a less power-intensive mode. It should be noted that although operation in some modes may result in transmission of information with less energy per transmitted bit than in other modes, it is the aggregate energy consumed by the multi-mode PCD 100A over a typical transmission time interval, not necessarily the energy per bit, that causes the multi-mode PCD 100A or portions thereof to become hot. That is, for a given amount of data to be transmitted, temperatures in the multi-mode PCD 100A will be higher in an instance in which the multi-mode PCD 100A transmits the data in a more power-intensive mode than in a less power-intensive mode.

The CPU 110 may also be coupled to one or more internal, on-chip thermal sensors 157A as well as one or more external, off-chip thermal sensors 157B (collectively referred to as sensors 157). The on-chip thermal sensors 157A may comprise one or more proportional-to-absolute temperature ("PTAT") temperature sensors that are based on a vertical PNP structure and are usually dedicated to complementary metal oxide semiconductor ("CMOS") very large-scale integration ("VLSI") circuits.

The off-chip thermal sensors 157B may comprise one or more thermistors. The thermal sensors 157 may produce a voltage drop that is converted to digital signals with an analog-to-digital converter controller (not shown). However, other types of thermal sensors 157 may be employed without departing from the scope of the PCD 100A. The thermal sensors 157 may be distributed throughout the on-chip system 102 such that they may sense the heat emitted by various electronic circuit elements.

The thermal sensors 157 may be controlled and monitored by one or more thermal policy manager modules 101. The one or more thermal policy manager modules may comprise software which is executed by the CPU 110. However, a thermal policy manager module 101 may also be formed from hardware and/or firmware without departing from the scope of the PCD 100A.

In general, a thermal policy manager module 101 may be responsible for monitoring and applying thermal policies that include one or more mode selection methods that may help the multi-mode PCD 100A manage thermal conditions and/or thermal loads and avoid experiencing adverse thermal conditions, such as, for example, reaching critical temperatures, while maintaining a high level of functionality.

FIG. 1A also shows that the multi-mode PCD 100A may include a monitor module 114. The monitor module 114 communicates with one or more of the thermal sensors 157 and with the CPU 110 as well as with the thermal policy manager module 101. The thermal policy manager module 101 may work with the monitor module 114 to identify adverse thermal conditions and apply thermal policies that include one or more mode-selection thermal mitigation methods as described in further detail below. The multi-mode PCD 100A may further include modem application modules 277 that are executed by the analog signal processor 126 that is coupled to the RF transceiver 168. The modem application modules 277 may be responsible for switching between airlinks as will be described in more detail below. The multi-mode PCD 100A also includes an uplink analyzer module 292 residing in memory 112 that analyzes conditions of the PCT 100A to determine if a switch to a more thermally efficient airlink should be made.

The method steps described herein may be implemented in whole or part by executable instructions stored in a memory 112 that form the one or more thermal policy manager modules 101, modem application modules 277, and uplink analyzer modules 292. These instructions that form the thermal policy manager modules 101, modem application modules 277, and uplink analyzer modules 292 may be executed by the CPU 110, the analog signal processor 126, or another processor or circuit element, to perform the methods described herein. Further, the processors 110 and 126, the memory 112, the instructions stored therein, or a combination thereof may serve as a means for performing one or more of the method steps described herein.

As illustrated in FIG. 1A, the multi-mode PCD 100A further includes a display controller 128 and a touchscreen controller 130 that are coupled to the digital signal processor 110. A touchscreen display 132 external to the on-chip system 102 is coupled to the display controller 128 and the touchscreen controller 130. The multi-mode PCD 100A also includes a video decoder 134, a video amplifier 136 and a video port 138. The video decoder 134 is coupled to the CPU 110. The video amplifier 136 is coupled to the video decoder 134 and the touchscreen display 132. The video port 138 is coupled to the video amplifier 136.

A universal serial bus ("USB") controller 140 is also coupled to the CPU 110. Also, a USB port 142 is coupled to the USB controller 140. The memory 112 and a subscriber identity module (SIM) card 146 may also be coupled to the CPU 110.

Further, as shown in FIG. 1A, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1A, a stereo audio coder-decoder ("CODEC") 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1A shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

As further shown in FIG. 1A, a radio frequency ("RF") transceiver 168 may be coupled to the analog signal processor 126. An RF switch 170 may be coupled to the RF transceiver 168 and an RF antenna 172. As shown in FIG. 1A, a keypad 174 may be coupled to the analog signal processor 126. Also, a mono headset with a microphone 176 may be coupled to the analog signal processor 126. Further, a vibrator device 178 may be coupled to the analog signal processor 126.

FIG. 1A also shows that a power supply 180, for example a battery, is coupled to the on-chip system 102. In a particular aspect, the power supply includes a rechargeable direct current ("DC") battery or a DC power supply that is derived from an alternating current ("AC")-to-DC transformer that is connected to an AC power source.

The touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102 in the exemplary embodiment shown in FIG. 1A. However, it should be understood that the monitor module 114 may also receive one or more indications or signals from one or more of these external devices by way of the analog signal processor 126 and the CPU 110 to aid in the real-time management of the resources operable on the multi-mode PCD 100A.

The multi-mode PCD 100A further includes a proximity sensor module 199. Many PCDs that can transmit radio-frequency ("RF) signals such as wireless local area network ("WLAN") signals and cellular telephone network signals are mandated by government agencies, like the U.S. Federal Communications Commission ("FCC"), to have hardware and/or software which track the specific absorption rate ("SAR") of RF signals into the operators who may be adjacent to a PCD 100A.

This hardware and/or software usually detects if the PCD 100A has been positioned within close proximity of an operator, such as adjacent to the operator's head or adjacent to the operator's legs such as on the operator's lap. While this SAR hardware/software (referred to generally as a "module" 199 hereinafter) may be used to adjust RF output of the PCD 100A, it may also be used by the PCD 100A for selecting appropriate airlinks that do not heat the PCD 100A beyond acceptable temperature ranges for human contact as well as transmit RF signals at power levels that may harm humans.

As noted above, a temperature limit may be external to the PCD 100A. Also internal device temperature limits may also be considered with the inventive system. As apparent to one of ordinary skill in the art, temperature constraints of the PCD 100A may impacted and/or affected by environment. Two specific examples of environments that may impact operation of a PCD 100A include, but are not limited to, the following: (A) Safety for body-worn PCDs 100A that do not exceed an acceptable temperature for human contact or even internal embedded devices for medical applications; and (B) Low infrared ("IR") observability for military applications, not exceeding ambient temperature by certain amount to prevent IR camera detection by creating an obvious hotspot during transmission. Such exemplary embodiments include PCDs 100A functioning as military radios worn by soldiers, or mounted on vehicles. For example, a remote stealth observation drone having a PCD 100A may intelligently select transmission airlinks depending on ambient temperature environment (desert sun vs. cold night) while still maintaining low observability.

The airlink mode-switching thermal management methods described herein may be effected through the thermal policy manager module 101 or, alternatively or in addition, through the execution of software by the CPU 110. The various thermal sensors 157 may be positioned sufficiently adjacent to and in sufficient thermal connection with various hardware elements of the multi-mode PCD 100A, such as, for example, the CPU 110, the RF transceiver 168, and the RF switch 170, so that the hardware element associated with the sensed heat may be identified.

FIG. 1B is an illustration of PCDs 100B,C for medical use which may be embedded (PCD 100B) in a human body 250 or worn on the human body (PCD 100C) supported by a strap 215. The PCDs 100B,C of this exemplary embodiment may be designed to monitor conditions of a human body such as heart rate, respiration rate, oxygenations levels in the blood stream, blood pressure, body temperature, and levels of medicine released and present in the human body, etc. These PCDs 100B,C, may comprise additional sensors (not illustrated) which sense these human body conditions. The PCDs 100B,C may store this information in memory 112 for relaying in an uplink to base station or base hub that may be located in a medical practitioner's office or in a hospital. While these PCDs 100B,C are illustrated in connection with a human body 250, they can be easily designed for any animals, such as in dogs, cats, etc. as understood by one of ordinary skill in the art.

FIG. 1C is an illustration of a PCD 100D for medical use that is in the form of a bracelet that is worn on an extremity of the human body such as on an arm or wrist of an operator. The PCD 100D may comprise an interactive display 132 which provides various options for an operator to select. For example, the interactive display 132 may comprise an alert button 305A for activating an alert condition; a medical data button 305B for obtaining current status of medical information; a transfer button 305C for initiating a transfer of the medical information over an available airlink; a menu button 305D for listing additional options; a push-2-talk button for activating audio communications; a start button 305F for activating a function at a specific moment when depressed; and a stop button 305G for stopping a function at a specific moment when depressed.

FIG. 1D is an illustration of a PCD 100E for medical use that is in the form of a unit which may be worn on the human body in the form of a necklace or lanyard. The PCD 100E may be coupled to a flexible cord member 333 that may allow the PCD 100E to be worn around the neck of an operator.

Figure 2A:
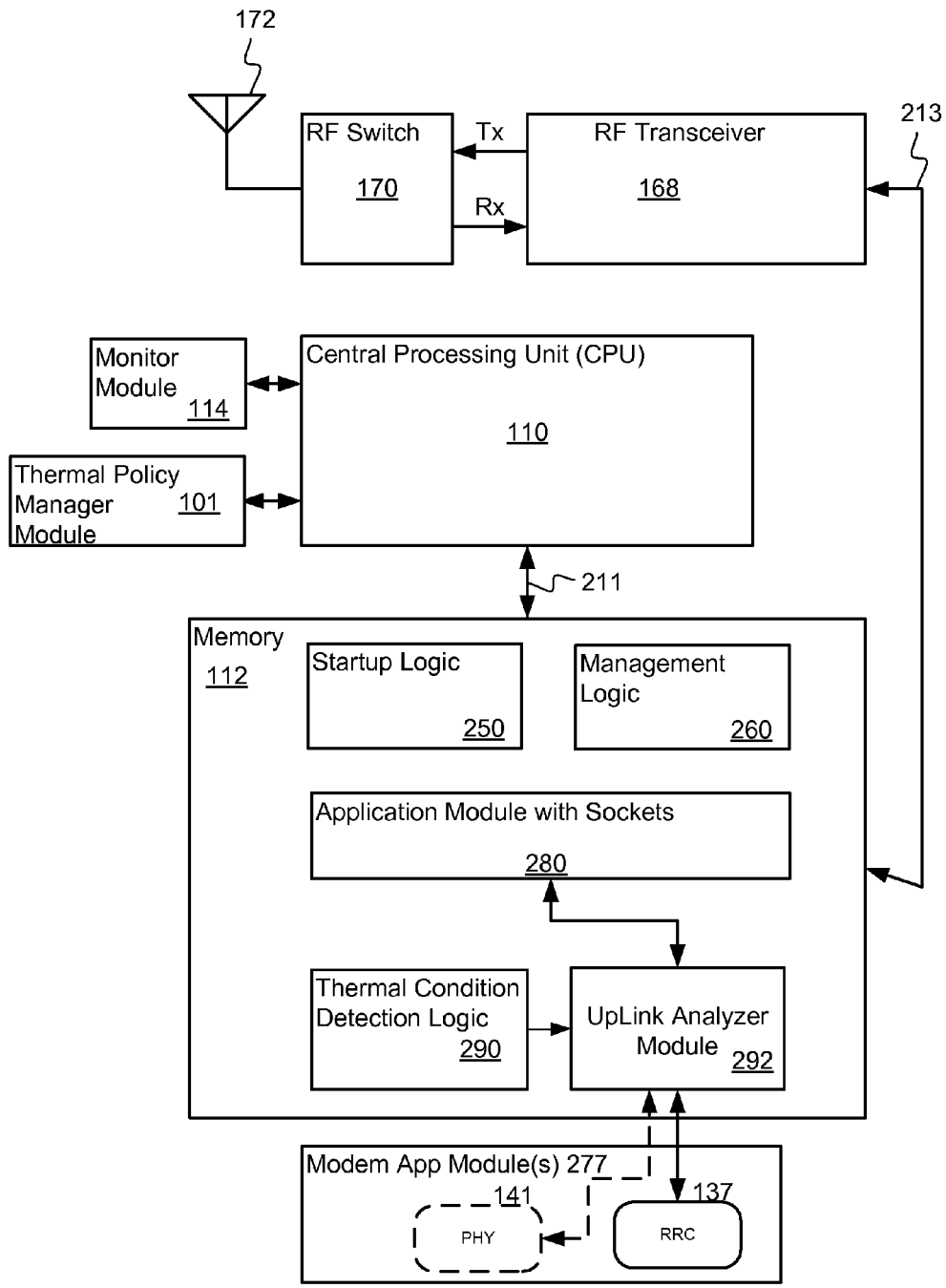
FIG. 2A is a block diagram showing processing and transceiver elements of the multi-mode PCD of FIG. 1.

As illustrated in FIG. 2A, the CPU 110 is coupled to the memory 112 via a bus 211. The CPU 110 may receive commands from the thermal policy manager module 101, which may be embodied in hardware, software or a combination thereof. Software embodying the thermal policy manager module 101 may comprise instructions that are executed by the CPU 110. A process defined by the execution of such instructions by the CPU 110 may cause commands to be issued to other processes or application programs being executed by the CPU 110 or to other cores or processors.

The RF transceiver 168 is coupled to the memory 112 via bus 213. The RF transceiver 168 may include one or more processors (not shown). The CPU 110 coordinates the transfer of information in digital form from the memory 112 to the RF transceiver 168 via bus 213. Some of the transferred information represents information to be wirelessly transmitted via the RF transceiver 168.

Each of buses 211 and 213 may include multiple communication paths via one or more wired or wireless connections, as is known in the art. The buses 211 and 213 may have additional elements, which are not shown for purposes of clarity, such as controllers, buffers (caches), drivers, repeaters, and receivers, to enable communications. Further, the bus 211 and the bus 213 may include address, control, and/or data connections to enable appropriate communications among the aforementioned components.

Memory 112 is generally of a type in which software elements, such as data and programming code, are operated upon by the CPU 110. In accordance with conventional computing principles, the CPU 110 operates under the control of programming code, such as operating system code and application program code. In the exemplary embodiment such programming code, i.e., software elements, includes startup logic 250, management logic 260, one or more application modules 280 that have sockets 189 (not illustrated), thermal condition detection logic 290, and the uplink analyzer module 292.

Meanwhile, modem application modules 277 that include an RRC module 137 and a PHY module 141 may reside in memory 112 or be stored in or retrieved by the analog signal processor 114. The RRC module 137, as will be described below in connection with FIG. 2A, may be responsible for tracking airlink information such as, but not limited to, high speed downlink packet access ("HSDPA") category information, enhanced uplink layer ("EUL") category information, and discontinuous reception/transmission ("DRX/DTX") configuration ("Config") information.

The PHY module 141 may be responsible for tracking downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 141 may also communicate uplink ("UL") information, such as, but not limited to, BLER, modulation, and transmitter ("Tx") automatic gain control ("AGC").

Although these software elements are conceptually shown for purposes of illustration as stored or residing in memory 112, it is understood that such software elements may not reside simultaneously or in their entireties in memory 112 but rather may be retrieved in portions via the CPU 110 on an as-needed basis, e.g., in code segments, files, instruction-by-instruction, or any other suitable basis, from any of the other sources of software or firmware shown in FIG. 1, such as the thermal policy manager module 101.

It should be noted that, as programmed with the above-described software elements or portions thereof, the combination of the CPU 110, analog signal processor 114, the memory 112 (or other element or elements in which software elements are stored or reside) and any related elements generally defines a programmed processor system. It should also be noted that the combination of software elements and the computer-usable medium on which they are stored or in which they reside generally constitutes what is referred to in the patent lexicon as a "computer program product."

Although the memory 112 represents an exemplary computer-usable or computer-readable medium, more generally, a computer-readable medium is an electronic, magnetic, optical, electromagnetic, or semiconductor system, apparatus, device or other physical device or means that may contain or store a computer program and data for use by or in connection with a computer-related system or method.

The various logic elements shown in FIG. 2A and other such logic elements may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a computer-readable medium may include any means that may store, communicate, propagate, or transport the information for use by or in connection with the instruction execution system, apparatus, or device.

Examples (i.e., a non-exhaustive list) of computer-readable media include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Although in the exemplary embodiment the startup logic 250, management logic 260, application module 280, thermal condition detection logic 290, the uplink analyzer module 292, the RRC module 137, and the PHY module 141, are software elements, in other embodiments they may be implemented with any or a combination of the following technologies, which are each well known in the art: a discrete logic circuit(s) having logic gates for implementing logic functions upon data signals, combination logic in an application specific integrated circuit (ASIC), a programmable gate array(s) (PGA), a field programmable gate array (FPGA), etc.

Under the control of the uplink analyzer module 292, the CPU 110 may switch the airlink mode under which the multi-mode PCD 100 is operating to another airlink mode and otherwise select the airlink mode. The uplink analyzer module 292 may include not only portions that relate to the mode-selection thermal mitigation methods described herein but may also include conventional portions that relate to conventional method for selecting airlink modes. As well understood by a person of ordinary skill in the art, such conventional mode selection methods may include selecting, from among a set of two or more airlink modes, an airlink mode that provides the highest quality RF signal link in communicating with a base station or other device. Such conventional airlink selection methods may also include manual selection methods in which a user instructs the multi-mode PCD 100 to operate in an airlink mode specified by the user or within a set of airlink modes specified by the user or, conversely, to refrain from operating in one or more user-specified airlink modes.

For example, a user can instruct the multi-mode PCD 100 to refrain from operating in LTE mode (for the purpose of, for example, conserving battery power). More typically, conventional airlink selection modes automatically select modes in accordance with a hierarchical preference scheme. For example, in an instance in which the multi-mode PCD 100 is roaming in a geographic region in which a sufficiently high-quality RF signal link can be established with a base station, then the multi-mode PCD 100 may select LTE mode over other modes that do not provide as high a rate of data transmission throughput as LTE mode is capable of providing.

However, in an instance in which the multi-mode PCD 100 is roaming in a geographic region in which no base stations exist that provide LTE mode or in which only an unacceptably low-quality RF signal link can be established with a base station in LTE mode, then the multi-mode PCD 100 may select an alternative mode that may not be capable of providing as high a rate of data transmission throughput. As such conventional mode-selection methods are well understood by a person of ordinary skill in the art, they are not described in further detail herein.

The portions of uplink analyzer 292 that relate to the mode-selection thermal mitigation methods described herein are responsive to the above-referenced thermal condition detection logic 290. That is, the CPU 100, operating in accordance with both the mode control logic 292 and the thermal condition detection logic 290, may select an airlink mode from among a set of two or more selectable airlink modes that may help mitigate potentially detrimental thermal conditions, such as one or more temperatures within the multi-mode PCD 100 that may exceed a critical threshold.

As described above, operating the multi-mode PCD 100 in some airlink modes is known to cause the multi-mode PCD 100 or portions thereof to produce more heat than operating the multi-mode PCD 100 in other modes. Thus, to help mitigate potentially detrimental thermal conditions, the multi-mode PCD 100 may be switched from a more power-intensive mode to a less power-intensive mode. Note that the one or more temperatures within the multi-mode PCD 100 may be sensed or monitored by the various thermal sensors 157 described above.

In FIG. 2A, the uplink analyzer module 292 is coupled to the application module 280 and the RRC module 137 and the PHY module 141. The PHY module 141 is illustrated with dashed lines to show that this connection between the uplink analyzer 292 and the PHY module 141 only exists when the PCD 100 does not utilize standard TCP/IP communication protocols but proprietary protocols. In exemplary embodiments for PCDs 100 which utilize proprietary communication protocols, such as in the case of the medical PCDs 100B-100D of FIGS. 1B-1D, the connection between the uplink analyzer 292 and the RRC module 137 would likely not exist.

Figure 2B:
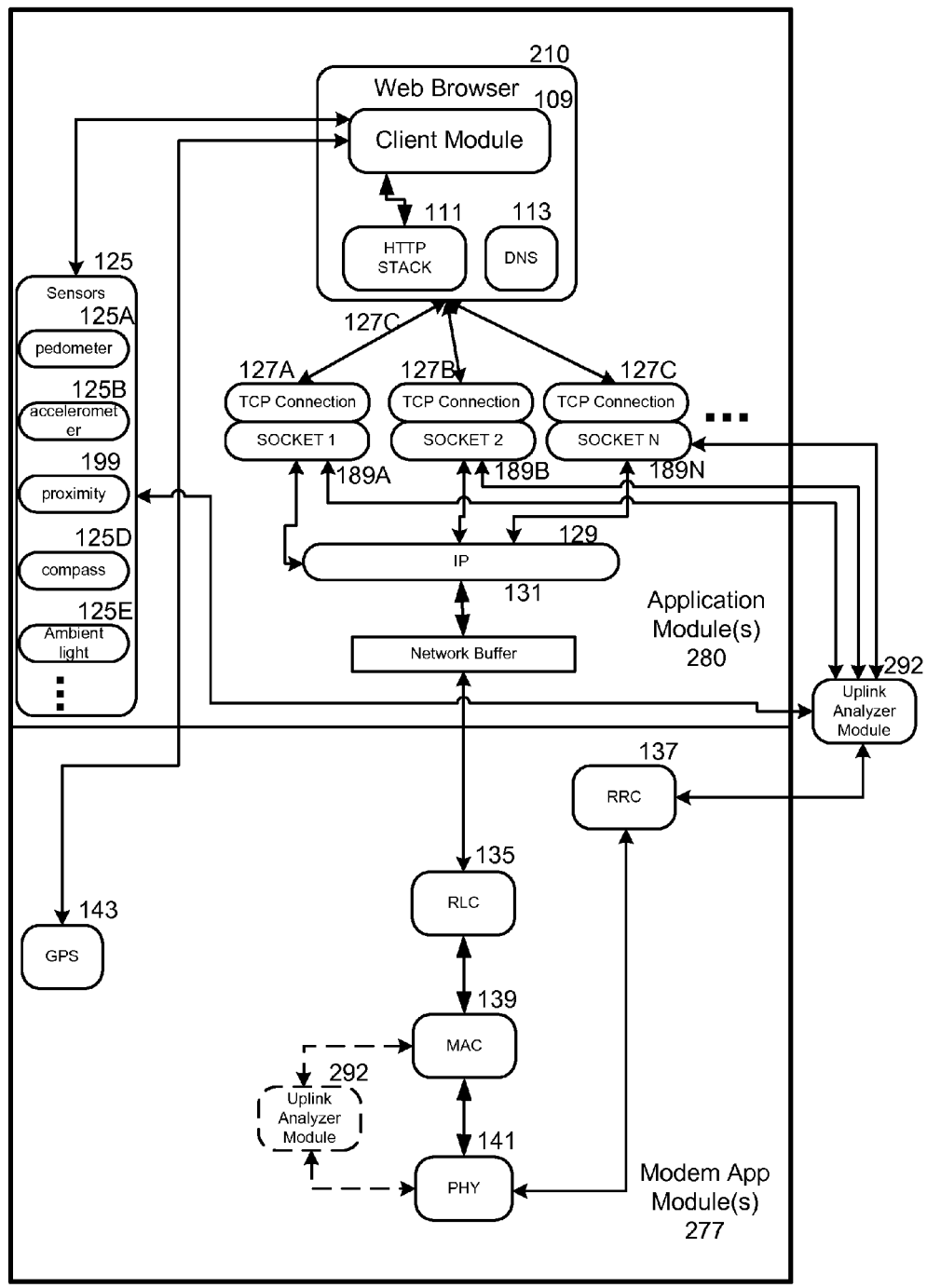
FIG. 2B is a block diagram showing further details of the application module and modem application module of FIG. 2A.

FIG. 2B is a block diagram showing further details of the application module 280 and modem application module 277 of FIG. 2A. The application module 280 may comprise a mobile web browser application 210 that is executed by a central processing unit 110 (see FIG. 2A) and which can run a client module 109.

The mobile web browser application or module 210 may communicate with transmission control protocol ("TCP") modules 127 that reside over an Internet protocol ("IP") layer 129 as understood to one of ordinary skill in the art and described below.

The TCP modules 127 may further comprise socket modules 189 as understood by one of ordinary skill in the art for establishing secure socket layers ("SSLs") or transport layer security ("TSL"). TSL and SSL comprise cryptographic protocols that provide communication security over the Internet. TLS and SSL encrypt the segments of network connections above the Transport Layer, using asymmetric cryptography for privacy and a keyed message authentication code for message reliability.

Meanwhile, the IP layer 129 communicates with a network buffer layer 131 as understood by one of ordinary skill the art. The IP layer 129 communicates with the modem subsystem 133, which is executed by a second central processing unit or the analog signal processor 126 (see FIG. 1A).

The mobile web browser module 210 may include a browser/client module 109, an HTTP stack 111, and a domain name server module 113. While illustrated as included within the web browser module 105, in a further alternative exemplary embodiment (not illustrated), the client module 109 may reside as a separate module relative to web browser 105.

The client module 109 running within the web browser module 210 may be responsible for controlling or instructing the web browser 210 on what file segments should be downloaded next to the PCD 100 to insure optimal quality for the PCD 100.

The DNS module 113 of the web browser 210 may be responsible for translating text based domain names into the numeric Internet protocol (IP) address as understood by one of ordinary skill the art. The DNS module 113 may communicate the IP address back to the HTTP stack 111 which in turn relays it to the TCP connection module 127.

When the HTTP stack 111 returns a meta-object from the TCP connection module 127, the HTTP stack module 111 may relays this meta-object to the client module 109. The http stack module 111 may also provide the client module 109 with certain status information. The status information may include, but is not limited to: high speed-schedule control channel ("HS-SCCH") Valid status; high speed transport block size ("HS-TBS"); layer one block error rates ("L1 BLER"); radio link control protocol data unit ("RLC PDU") size; radio link control down link service data unit ("RLC DL SDU") Byte received ("Rx"); high speed downlink packet access ("HSDPA") user equipment ("UE") Category; media access control uplink buffer status report ("MAC UL BSR"); enhanced uplink transmission time interval ("EUL TTI"); enhanced transport format combination index ("ETFCI") table index; ETCFI; the number of new transmissions ("Tx"); radio link control uplink service data unit ("RLC UL SDU") Byte transmission ("Tx"); diversity transmission/diversity reception ("DTX/DRX") mode; enhanced uplink user equipment ("EUL UE") category; media access control transmission layer transport block size ("MAC TL TBS"); packet data convergence protocol downlink service data unit ("PDCP DL SDU") Byte reception ("Rx"); media access control uplink transport block size ("MAC UL TBS"); packet data convergence protocol uplink service data unit ("PDCP UL SDU") Byte transmission ("Tx"); and user equipment category ("UE Category").

The client module 109 may be responsible for parsing and/or reviewing the meta-object and deciding which file segments are appropriate for the next download.

The Transmission Control Protocol ("TCP") connection module 127 operates in the Transport Layer of the Open Systems Interconnection ("OSI") model of general networking as understood by one of ordinary skill in the art. The TCP connection module 127 is responsible for encapsulating application data blocks into data units (datagrams, segments)

suitable for transfer to the network infrastructure for transmission to the destination host, or managing the reverse transaction by abstracting network datagrams and delivering their payload to the mobile web browser 105.

The TCP connection modules 127 may provide information that includes, but is not limited to, re-transmission time out ("RTO"); advertised receiver window ("Rx Window"); transmission-receiver throughput ("Tx/Rx Throughput"); packet statistics; a total number of TCP connections; estimated round-trip time ("RTT"); number of bytes received; the number of in sequence packets; and the TCP transmitting window size.

The Internet Protocol ("IP") module 129 communicates with the TCP connection module 127 and the network buffer layer 131. The IP module 129 has the task of delivering distinguished protocol datagrams (packets) from the mobile web browser to the server 210 based on their addresses. The IP module 129 defines addressing methods and structures for datagram encapsulation. The IP module 129 may utilize Internet Protocol Version 4 ("IPv4") as well as Internet Protocol Version 6 ("IPv6"), which is being deployed actively as of this writing. However, other versions of the Internet protocol, including future ones not yet developed, are included within the scope of the invention.

The network buffer layer 131 communicates with the IP module 129 and the modem subsystem 133. The network buffer layer 131 may contain all hardware specific interface methods, such as Ethernet and other IEEE 802 encapsulation schemes. The network buffer layer 131 may probe the topology of a local network, such as the communications network 206. It may discover routers and neighboring hosts, and it may be responsible for discovery of other nodes on the link. The network buffer layer 131 may determine the link layer addresses of other nodes, find available routers, and maintaining reachability information about the paths to other active neighbor nodes.

The client module 109 may also communicate with one or more sensors 125. The sensors 125 may include, but are not limited to, pedometer 125A, an accelerometer 125B, a compass 125D, and an ambient light sensor 125E. The pedometer 125A may provide signals that indicate that the PCD 100 is being used by a person who is walking and which may be determined by a client module 109 that may comprise a GPS application module.

The accelerometer 125B may provide signals that indicate that the PCD 100 is located in a motorized vehicle, such as an automobile. The proximity sensor 199, as noted above, may indicate if the PCD 100 is positioned next to a person's face for conducting a telephone call and it may be coupled directly to the uplink analyzer module 292. The compass 125D may provide signals that indicate a specific direction in which the PCD 100 is traveling. And the ambient light sensor 125E may provide signals to indicate if the PCD 100 is being used in a light or dark environment.

The uplink analyzer module 292 monitors the output of the sockets 189. The uplink analyzer 292 may collect and store this output for further review. For example, the uplink analyzer module 292 may store levels relating to the volume of data currently being sent over an airlink. The uplink analyzer module 292 may further track the duration in which an airlink is kept open (or "on" and consuming power of the PCD 100) as well as the quality of service ("QoS") of the current data being transmitted over each socket 189. Based on these parameters as well as any temperature data that the uplink analyzer module 292 may receive from the thermal condition detection logic 290 (and sensors 157), the uplink analyzer module 292 may determine the most thermally optimal airlink to be used by the PCD 100. The uplink analyzer module 292 may instruct the RRC module 137 of the modem application modules 277 to select the thermally optimal airlink it determined from its calculations.

The uplink analyzer module 292 may calculate a predetermined time period in which the client module 109 must maintain or use a lower bit rate until the signal-to-noise ratio stays high and/or the BLER stays low continuously. The uplink analyzer module 292 may also turn "on" or turn "off" any type of receive diversity function(s) in the modem application modules 277 in order to minimize power during ideal network situations, such as when the PCD 100 is stationary, or when the PCD 100 is operating under relatively low-speed conditions, such as when operator is walking with the PCD 100.

A second exemplary embodiment of the uplink analyzer module 292 is illustrated in FIG. 2B with dashed lines and in which the module 292 is coupled to the MAC layer 139 and PHY layer 141. This exemplary embodiment of the uplink analyzer module 292 may be formed from hardware as understood by one of ordinary skill in the art. In such an exemplary embodiment, the analyzer module 292 may further comprise one or more memory buffers for storing and analyzing data from the MAC layer 139 and PHY layer 141.

The modem application modules 277 may comprise a radio link control ("RLC") layer 135, a media access control ("MAC") layer 139, a physical ("PHY") layer 141, a radio-relay control ("RRC") module 137, and a global positioning system ("GPS") 143. These elements of the modem subsystem 133 may be responsible for communicating with communications hardware such as the RF transceiver 168 as illustrated in FIG. 1A.

As noted above, the RRC module 137 may track airlink information such as, but not limited to, high speed downlink packet access ("HSDPA") category information, enhanced uplink layer ("EUL") category information, and discontinuous reception/transmission ("DRX/DTX") configuration ("Config") information to the uplink analyzer module 292. The RRC module 137 may also receive a selected or thermally optimal airlink from the uplink analyzer module 292.

As noted previously, the RLC module 135 may communicate throughput as well as radio link control ("RCL") protocol data unit ("PDU") size. The MAC layer 139 may communicate uplink ("UL") information, such as, but not limited to, buffer status report ("BSR") information and enhanced dedicated channel ("EDCH") transport format ("TF") information. The physical layer 141 may communicate the downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 141 may also communicate uplink ("UL") information, such as, but not limited to, BLER, modulation, and transmitter ("Tx") automatic gain control ("AGC").

The RRC module 137, RLC module 135, MAC module 139, and PHY module 141, may form an evolved high-speed packet access system ("HSPA") as is understood to one of ordinary skill the art. Meanwhile, the GPS module 143 may provide information, such as, but not limited to, location, and speed or velocity of the PCD 100.

Figure 3A:
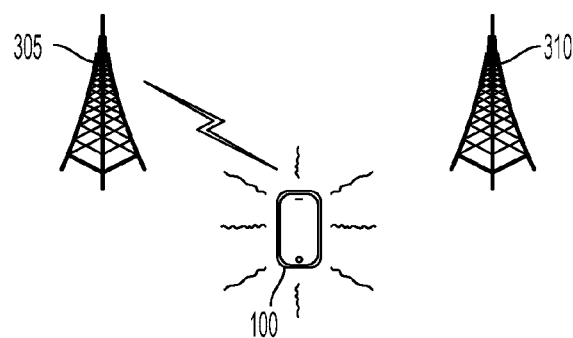
FIG. 3A is a conceptual illustration of an instance in which a monitored temperature in the multi-mode PCD of FIG. 1 exceeds a threshold.

As illustrated in FIG. 3A, an exemplary instance in which one or more of the monitored temperatures within the multi-mode PCD 100 exceed a threshold may define a thermal condition indicating to switch the airlink mode of the multi-mode PCD 100. (Although the excessive heat in FIG. 3A is indicated in a conceptual manner for purposes of illustration by lines appearing to radiate from the multi-mode PCD 100, a person of ordinary skill in the art understands that the heat may be concentrated or localized within portions of the circuitry of the multi-mode PCD 100, such as the CPU 110 and, furthermore, may or may not radiate from the multi-mode PCD 100 in any perceptible amount.)

Figure 3B:
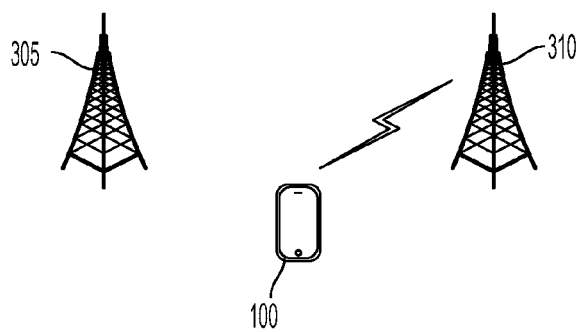
FIG. 3B is a conceptual illustration of the multi-mode PCD of FIG. 3A after switching from a more power-intensive airlink mode to a less power-intensive airlink mode.

As illustrated in FIG. 3B, in response to such a thermal condition, the multi-mode PCD 100 may switch from a more power-intensive mode to a less power-intensive mode. Note that although FIGS. 3A-B indicate that a first base station 305 is capable of wirelessly communicating with the multi-mode PCD 100 via the more power-intensive airlink mode, and a second base station 310 is capable of wirelessly communicating with the multi-mode PCD 100 via the less power-intensive mode, in other instances a single base station (not shown) may include multiple airlink systems and thus be capable of multi-mode operation, just as the multi-mode PCD 100 is capable of multi-mode operation. Also, although the mode switching or mode selection method is described herein for purposes of clarity as being responsive to the determined thermal conditions, the mode switching or mode selection method may be responsive to additional conditions, which may or may not be thermal conditions. For example, a non-thermal condition may include RF signal link quality. As described further below, such a non-thermal condition may be represent another factor or input in the determination whether to switch the airlink mode.

Figure 4A:
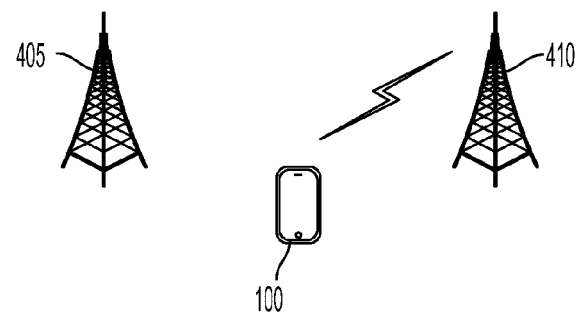
FIG. 4A is a conceptual illustration of an instance in which a monitored temperature in the multi-mode PCD of FIG. 1 does not exceed a threshold.
Figure 4B:
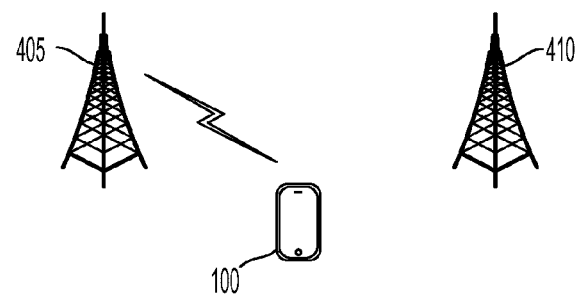
FIG. 4B is a conceptual illustration of the multi-mode PCD of FIG. 4A after switching the airlink mode.

As illustrated in FIG. 4A, an exemplary instance in which one or more of the monitored temperatures within the multi-mode PCD 100 do not exceed a threshold may define a thermal condition that does not indicate to switch the airlink mode of the multi-mode PCD 100. In such an instance, the temperature may not be sufficiently high as to be potentially detrimental the circuitry of the multi-mode PCD 100. Thus, as illustrated in FIG. 4B, the airlink may be switched from a first airlink (indicated in FIG. 4A for purposes of illustration as involving communication with a first base station 405) to a second airlink (indicated in FIG. 4B for purposes of illustration as involving communication with a second base station 410) in accordance with conventional methods, such as in response to RF signal link quality.

Figure 5A:
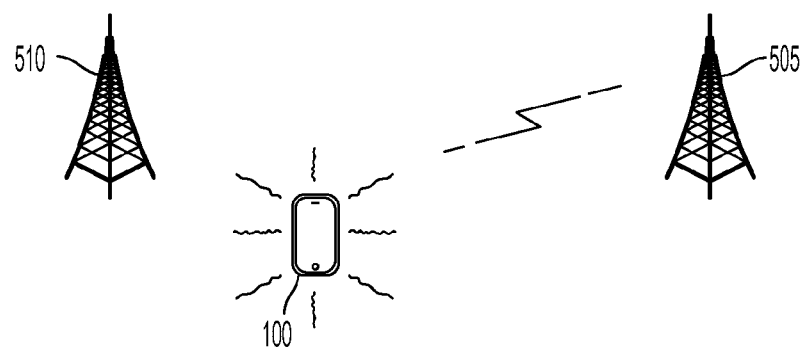
FIG. 5A is a conceptual illustration of an instance in which low airlink signal quality indicates to switch airlink modes but the monitored temperature in the multi-mode PCD of FIG. 1 exceeds a threshold.
Figure 5B:
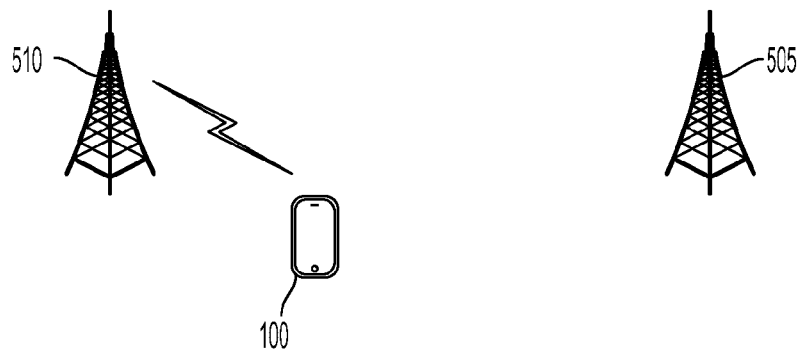
FIG. 5B is a conceptual illustration of the multi-mode PCD of FIG. 5A after switching the airlink mode.

As illustrated in FIG. 5A, both the thermal condition and RF signal link quality (i.e., a non-thermal condition) may be involved in a mode switching method. In an exemplary instance in which one or more of the monitored temperatures within the multi-mode PCD 100 exceed a threshold, and in which low RF signal link quality indicates switching the airlink mode, mode switching can further take into account the thermal condition, thus representing a combination of a temperature-driven method and a conventional signal quality-based method. For example, if the mode that the signal quality-based determination indicates is to be selected or switched to is more power intensive than the mode in which the multi-mode PCD 100 is then operating, switching to the more power-intensive mode may exacerbate the thermal condition by potentially raising temperatures even further.

Note that the RF signal link quality may be low despite the multi-mode PCD 100 transmitting at a high power in an attempt to achieve a high quality RF signal link (e.g., with a more distant base station 505). The high transmission power may contribute to one or more of the monitored temperatures exceeding a threshold. In such an instance, mode switching can be modified from conventional methods by, for example, deferring or delaying mode switching for a short time interval to afford the excess heat time to dissipate or afford the RF signal link quality time to improve. Thus, for example, if the thermal condition improves, i.e., the temperature decreases, the airlink may be switched from a less power-intensive mode (indicated in FIG. 4A for purposes of illustration as involving communication with a first base station 505) to a more power-intensive mode (indicated in FIG. 4B for purposes of illustration as involving communication with a second base station 510).

FIG. 6A is an illustration that includes two graphs: a first graph 600A1 which plots theoretical values of Time vs. Temperature for two different airlinks 602A, 602B and second graph 600A2 which plots an estimated Time vs. data volume 609A. Ideally, the uplink analyzer module 292 would receive estimates of data volume, estimates of uplink duration, an estimated quality of service parameters directly from each application module 280. However, as of this writing many application modules 280 will likely not provide the uplink analyzer module 292 with these parameters.

Therefore, the uplink analyzer module 292 will analyze the output from each application module 280 such as the sockets 189 as illustrated in FIG. 2B. From the sockets 189, the uplink analyzer module 292 may employ various different predictive models to estimate these parameters as will be described in further detail below in connection with FIG. 8.

Once the uplink analyzer module 292 has its estimates for data volume, uplink duration, and quality of service, the analyzer module 292 may compare available theoretical values of airlinks against one another such as illustrated in FIG. 6A. FIG. 6A illustrates a first airlink 602A and a second airlink 602B.

The first airlink 602A has a steeper thermal characteristic relative to the second airlink 602B meaning that the temperature of the PCD 100 rises much faster relative to the rate of temperature increase for the second airlink 602B over time. However, while not illustrated in graph 600A, the first airlink 602A may provide for faster data uploads and a better quality of service relative to the second airlink 602B. This also means that the second airlink 602B may provide for slower data uploads and a lower quality of service relative to the first airlink 602A.

The differences between how these two airlinks 602A, 602B handle the data 609A illustrated in the second graph 600A2 are demonstrated by a first point 607 on the first airlink curve 602A and the second point 611 on the second airlink 602B.

The first point 607 on the first airlink curve 602A is a theoretical endpoint for the transmission of the data 609A of the second graph 600A2. Meanwhile, the second point 611 on the second airlink curve 602B is a theoretical endpoint for the transmission of the data 600A of the second graph 600A2. While the first endpoint 607 on the first airlink curve 602A demonstrates that the data 609A of the second graph 600A2 was transmitted in a shorter amount of time (delta T) relative to the second end point 611 on the second airlink curve 602B, the first endpoint 607 on the first airlink curve 602A is at a much higher temperature relative to the second endpoint 611 on the second airlink curve 602B.

The uplink analyzer module 292 may use equation labeled in FIG. 6A with reference numeral 613 to determine the differences in energy consumption (energy saved) between a plurality of different airlinks:

$$\text{Delta Time} \times \text{Delta Power} = \text{Delta Thermal Energy Saved} \qquad \text{EQ1:}$$

wherein Delta Time is the differences between the end transmission times or durations between a respective pair of airlinks, Delta Power is the differences between the amount of power required for each respective airlink.

While the uplink analyzer module 292 may determine a single, most thermally optimal airlink to select based on the parameters described above, the uplink analyzer 292 may also recommend a combination of airlinks to select in order to increase thermal efficiency of the PCD 100. Such a recommendation of a combination of air links to select in order to increase thermal efficiency of the PCD 100 as illustrated in FIG. 6B.

FIG. 6B is an illustration that includes two graphs: a first graph 600B1 which plots theoretical values of Time vs. Temperature for two separate airlinks 602A, 602B and a second graph which plots an estimated Time vs. data volume 609B. According to this exemplary embodiment, the data volume 609B consumes a longer period of time to transmit less data compared to the data volume 609A of graph 600A2. Such a change in data volume and duration impacts the performance of the respective first and second airlinks 602A, 602B as illustrated in the first graph 600B1 of FIG. 6B.

As illustrated in the first graph 600B1 of FIG. 6B, the first airlink 602A has a temperature slope that is relatively similar to the temperature slope of the second airlink 602B. However, the first airlink 602A plateaus at a higher temperature and much later relative to the plateau of the second airlink 602B.

Therefore, the uplink analyzer 292 may recommend that the first airlink 602A be used up to a certain temperature marked with point 615. At point 615, the uplink analyzer may then recommend that the PCD 100 switch from the first airlink 602A to the second airlink 602B. the PCD 100 would use the second airlink 602B from point 617 to an endpoint 619.

While endpoint 619, which is the end of transmission for the data volume 609B on the second airlink 602B, takes longer to occur relative to the theoretical endpoint 621 for the first airlink 602A, the differences in temperature savings or thermal efficiencies are significantly greater with the endpoint 619 on the second airlink 602B. As noted previously, the uplink analyzer 292 may select a combination of airlinks to support the transmission of data volume 609. The uplink analyzer 292 may also select a single thermally optimal airlink to support a particular transmission of a data volume 609. The uplink analyzer 292 will usually instruct the RRC module 137 of a particular airlink to use in addition to the rate at which the data volume 609 should be sent over the airlink as well as the duration of use for the airlink.

Figure 7:
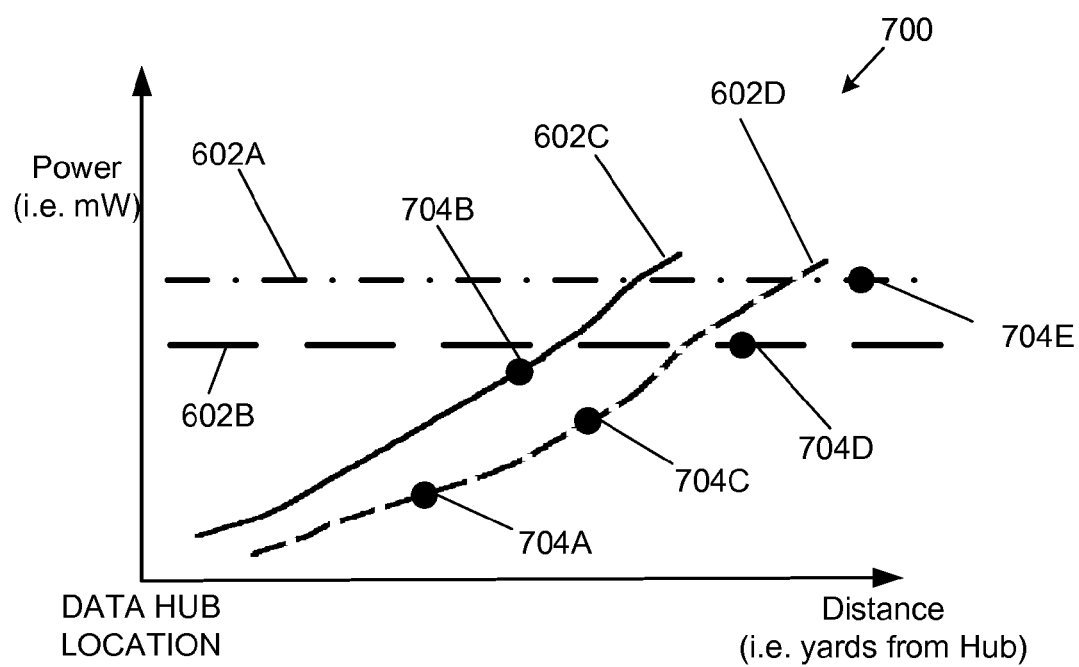
FIG. 7 is a graph which plots distance from a data hub against requisite power to couple a PCD to the datahub for a plurality of different airlinks with different power characteristics which may be useful for selecting uplinks for PCDs used in medical contexts.

FIG. 7 is a graph 700 which plots distance from a data hub against requisite power to couple a PCD 100 to the datahub for a plurality of different airlinks 602A-602D with different power characteristics which may be useful for selecting uplinks for PCDs 100 used in medical contexts. This graph 700 may be utilized by embedded PCDs 100B as well as PCDs 100C-E that may be worn close or proximate to an animal body, such as a human (as illustrated in FIGS. 1B-1D) or a pet.

The first airlink 602A may comprise a first cellular telephone airlink that provides high quality of service for data, while the second airlink 602B may comprise a second cellular telephone airlink that provides a lower quality of service for data relative to the first airlink 602A. The third airlink 602C may comprise a personal area network type airlink such as BLUETOOTH™, while the fourth airlink comprises a wireless LAN type airlink, like WIFI™.

As the graph 700 illustrates, the first, higher-quality cellular telephone airlink 602A may require the highest amount of power relative to the other airlinks 602B-D. The lower quality cellular telephone airlink 602B may require less power relative to the higher-quality cellular telephone airlink 602A.

At certain distances relative to the data hub location, the third airlink 602C may require less power than both the first and second cellular telephone airlinks 602A-B. Similarly, at certain distances relative to the datahub location, the fourth airlink 602D may require less power compared to the remaining three airlinks 602A-C.

Therefore, depending upon the volume of data to be sent at a certain instant of time, the duration of an uplink, and the required quality of service at a certain instant of time, the uplink analyzer 292 may recommend a combination of different airlinks 602 to be employed for PCDs 100 that relay medical information and which may be proximate to an animal, such as a human being. In the exemplary embodiment illustrated in FIG. 7, at a first distance 704A, the uplink analyzer 292 may recommend that the fourth airlink 602D be used for a given block of data, while at a second distance, the uplink analyzer 292 may recommend that the third airlink 602C be used for a given block of data.

Similarly, at a third distance 704C, the uplink analyzer 292 could recommend to switch back to the fourth airlink 602D. Then at a fourth distance 704D, the uplink analyzer 292 could recommend to switch to the second cellular telephone airlink 602B in order to meet certain quality conditions for a particular block of data. And lastly, at a fifth distance 704E relative to the data hub, the uplink analyzer 292 could recommend that the first cellular telephone airlink 602A having the highest quality of service be used for a given block of data.

FIG. 8 is an illustration that includes a plurality of predictive tables 800A-800C that estimate data volumes over various segments of time, such as seconds. As noted previously, if the uplink analyzer module 292 does not receive any estimates of data volume, uplink duration, and/or quality of service parameters from each application module 280, then the uplink analyzer module 292 will need to predict or estimate these parameters for monitoring the sockets 189 for each application module 280 as illustrated in FIG. 2B.

Any one of a number of predictive models may be used by the uplink analyzer module 292 to estimate data volume, uplink duration, and/or quality of service parameters. For example, for each TCP socket 189, a historical prediction method may be employed which is based on analyzing historical data from a socket 189. Alternatively, time series models may be used.

Time models often account for the fact that data points taken over time may have an internal structure (such as autocorrelation, trend or seasonal variation) that should be accounted for. As a result standard regression techniques cannot be applied to time series data and methodology has been developed to decompose the trend, seasonal and cyclical component of the series. Modeling the dynamic path of a variable can improve forecasts since the predictable component of the series can be projected into the future.

The time series models may estimate difference equations containing stochastic components. Two commonly used forms of these models include autoregressive models ("AR") and moving average ("MA") models. One time series model that may be employed is the Box-Jenkins methodology (1976) developed by George Box and G. M. Jenkins This time series model combines the AR and MA models to produce the ARMA ("autoregressive moving average") model. Another time series model which may be employed is ARIMA ("autoregressive integrated moving average") models which can be used to describe non-stationary time series.

The Box and Jenkins methodology comprises a three stage methodology which includes: model identification, estimation and validation. The identification stage involves identifying if the series is stationary or not and the presence of seasonality by examining plots of the series, autocorrelation and partial autocorrelation functions. In the estimation stage, models are estimated using non-linear time series or maximum likelihood estimation procedures. Finally the validation stage involves diagnostic checking such as plotting the residuals to detect outliers and evidence of model fit.

Another predictive method includes generating predictive or confidence tables 800A-C as illustrated in FIG. 8. Each table 800A,B,C illustrated in FIG. 8 may correspond to a particular single socket 189 as illustrated in FIG. 2B. The rows of each table 800 made define particular data rates that may be used for a particular airlink. In the exemplary embodiment illustrated in FIG. 8, the first row in each table 800 references a data rate of about two kilobits ("kb") per second. In each table 800 references a data rate of about five kb per second. And the third row references a data rate of about ten kb per second. One of ordinary skill in the art recognizes that other magnitudes greater or lower than those illustrated are well within the scope of the system of the PCD 100.

Each first column of each table 800 references a particular time slot. Timeslots may be defined using any one of a different number of increments, such as on the order of milliseconds and seconds. In the exemplary embodiment illustrated in FIG. 8, each timeslot represents a single second of time.

Each column of each table 800 adds to 100% since each cell of the table 800 represents a percentage or probability of likelihood that data is moving at a particular rate at a particular instant of time. So for example, in the first table 800A and in the first column, the uplink analyzer module 292 has determined that for a given socket during its first second transmission, the likelihood that the data rate will be approximately two kb per second is approximately 10%. The likelihood that the data rate will be approximately five kb per second for that same first timeslot is approximately 60%. And the likelihood that the data rate will be about ten kb per second for that first timeslot is approximately 20%.

Given these three estimates on probability, the uplink analyzer module 292 will likely assume that the first timeslot for a particular socket 189 being characterized by the first table 800A will likely have a data rate of five kilobits per second based on the 60% chance governed by the second cell in the first column of the table 800.

The tables 800A may be updated constantly after the uplink analyzer module 292 monitors and records historical data from each of the sockets 189. The uplink analyzer module 292 will generate predictive tables for estimating the volume of data that will be sent by a particular socket 189 as well as predictive tables to estimate the quality of service needed based on history from a particular socket 189. The uplink analyzer module 292 will also generate predictive tables for estimating the duration of the uplink. As described above, only predictive estimates of the data rate for three sockets 189 are illustrated in FIG. 8. Similar predictive tables would be generated by the uplink analyzer module 292 for other parameters of data volume, quality of service, duration of the uplink, and other similar parameters useful for selecting a thermally optimal airlink for PCD.

The third predictive table 800C may generally correspond with the second data volume 609B illustrated in FIG. 6B. The second data volume 609B comprises data that is sent out constantly over a lengthy time period. The third predictive table 800C and second data volume 609B are representative of data that is sent over an airlink which has a fairly constant rate, such as those used for streaming audio or streaming video as understood by one of ordinary skill in the art.

In most PCDs 100, thermal conditions may change dramatically between approximately two and seven minutes of time. Therefore, any predictive model employed by the uplink analyzer module 292 should generally store at least approximately one to two minutes of data as well as predicting data approximately one to two minutes out into the future.

Airlink selection may be made by the system using tables that show probabilities for quantity of data to be transmitted (e.g., "B" representing the number of bytes in a transmission burst). For example, a table (not illustrated) may record a running average and standard deviations for the size ("B") of the last set of "transmission bursts" over a socket. A "transmission burst" may be a collection of data packets transmitted close enough to each other in time (each time separation larger than a time "T_inter_burst" would delineate a new burst). Thus, the table may learn the typical transmission burst size ("B"). Then, prior to or upon the start of a new transmission burst, the airlink selection algorithm can perform the calculation B/Bandwidth 1 ("BW1") for a first airlink and B/Bandwidth 2 ("BW2") for a second airlink to compute a projected first temperature ("T1") for a first airlink, and as second temperature ("T2") for a second airlink. The algorithm may select an airlink that doesn't exceed a temperature threshold in the future.

The prediction tables described above may be applied per TCP socket, or even across sockets. For example, the opening of a socket, transmission, and the closing of a socket, may be considered as a "transmission burst" as mentioned above. This may be more appropriate for devices that open & close sockets for each piece of data (like an Internet web browser).

Other exemplary methods for temperature-driven airlink selection in a multi-mode PCD 100 are described below with reference to the flow diagrams of FIG. 9. Although certain steps or acts in the methods or process flows described herein naturally precede others for the exemplary embodiments of the invention to function as described, the invention is not limited to the order of the steps or acts described in embodiments in which such order or sequence does not alter the functionality of the invention. That is, it is recognized that in other embodiments some steps may performed before, after, or parallel (i.e., substantially simultaneously with) other steps without departing from the scope and spirit of the invention. In other embodiments, certain steps may be omitted or not performed without departing from the invention.

Also, words such as "thereafter," "then," "next," etc., are not intended to limit the order of the steps. Rather, these words are simply used to guide the reader through the description of the exemplary method. Similarly, although a step or act may be described as occurring first in the method, the method may begin at any point. A method or portion thereof may also occur repetitively or in a loop-like manner, even though it may be described only once. Exemplary method 900 may be performed or may occur at any suitable time during the operation of the multi-mode PCD 100. For example, the method may occur essentially in parallel with the wireless transmission and reception of information representing voice and data.

It should be understood that, based on these flow diagrams and associated descriptions in this specification, one of ordinary skill in the art is capable of creating or otherwise providing suitable software code or similar logic or creating or otherwise providing suitable hardware or similar logic to embody the disclosed invention without difficulty. Note that in the exemplary embodiments described herein such logic may be included in the thermal condition detection logic 290 and the mode control logic 292 (FIG. 2).

Such logic may provide a means for determining a thermal condition indicating whether to switch the airlink mode of the multi-mode PCD 100 in response to one or more monitored temperatures and a means for switching the multi-mode PCD 100 from a first airlink mode to a second airlink mode in response to such a thermal condition. It should be noted that although exemplary methods are described herein individually for purposes of clarity, the methods may be combined with each other in whole or part.

Figure 9:
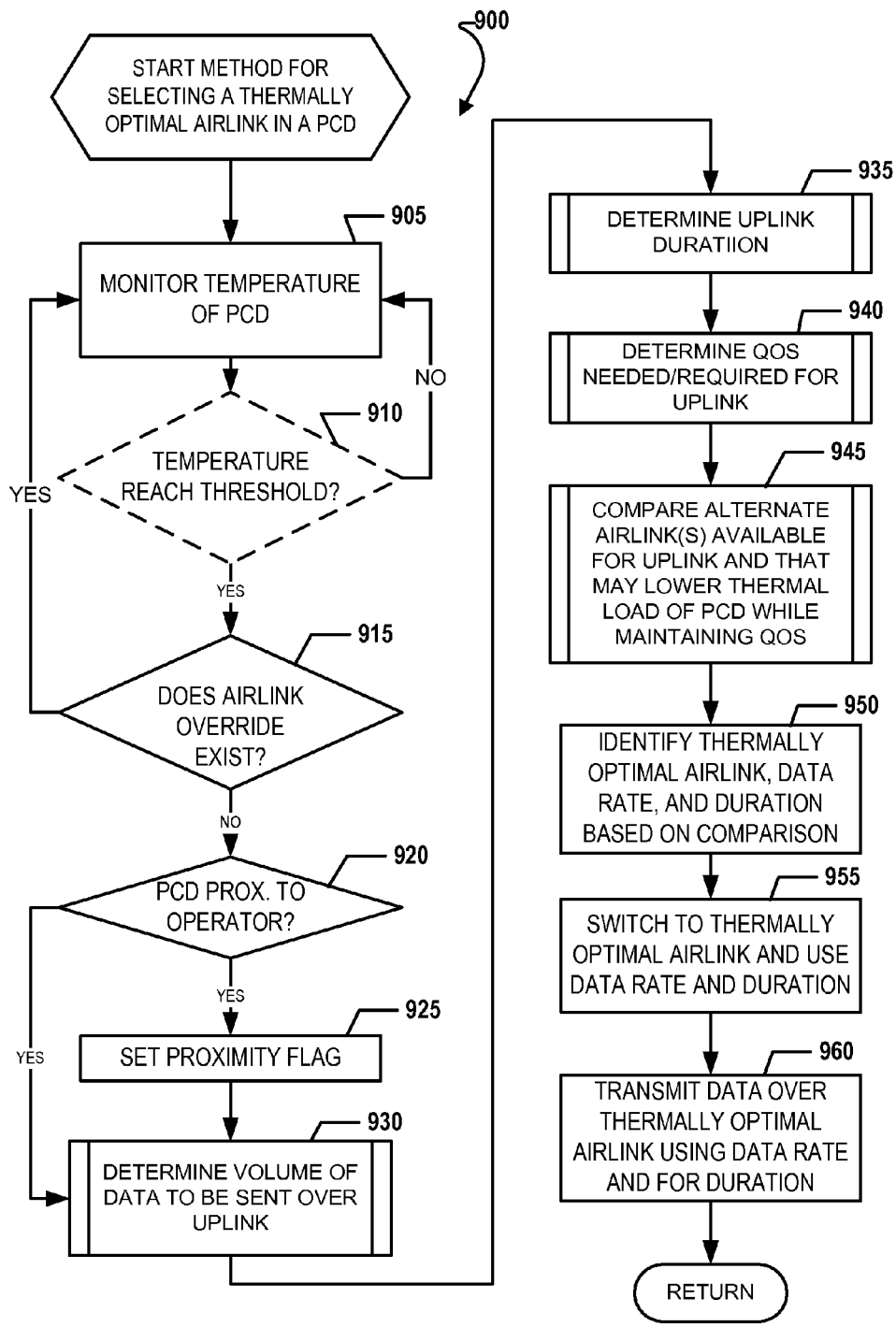
FIG. 9 is a logical flow diagram illustrating an exemplary method for selecting a thermally optimal airlink for the multi-mode PCD of FIG. 1.

FIG. 9 is a flow diagram illustrating an exemplary method 900 for selecting a thermally optimal airlink 602 for the multi-mode PCD of FIG. 1. The first step of method 900 includes block 905. In block 905, the monitor module 114 of FIG. 2A may monitor the temperature of the PCD 100A with the one or more thermal sensors 157 as illustrated in FIG. 1A.

Next, in decision block 910, the thermal policy manager module 101 may determine if the temperature threshold has been reached for activating or initializing the uplink analyzer module 292. Block 910 has been illustrated with dashed lines to indicate that this decision block 910 is optional in that the uplink analyzer module 292 in some exemplary embodiments may calculate thermally optimal airlinks 602 in the PCD 100A irrespective of a current thermal state or temperature.

In those exemplary embodiments in which decision block 910 is present which may be executed by the thermal policy manager module 101 (that can be integrated within the uplink analyzer module 292 as understood by one of ordinary skill in the art), if the inquiry to decision block 910 is negative, then the "No" branch is followed and the method goes back to block 905 in which the temperature of the PCD 100A is monitored.

If the inquiry to decision block 910 is positive, then the yes branch is followed to decision block 915. In decision block 915, the uplink analyzer module 292 determines if an airlink override the condition exists. The exemplary airlink override condition exists when an application program module 280 has exclusive control of an airlink mode because of the nature of data that may be transmitted. For example, if the PCD 100A is operating a mobile phone application program 280 in a geographic location that supports only a GSM airlink, such as parts of Europe, then the mobile phone application program 280 would have exclusive control of the GSM airlink and it would prevent the uplink analyzer module 292 from attempting to switch to another airlink. This means if the inquiry to decision block 915 is positive, then the "YES" branch is followed back to block 905.

If the inquiry to decision block 915 is negative, meaning that multiple airlinks or different airlinks may be selected for a particular application program 280 that is transmitting data, then the "NO" branch is followed to decision block 920 in which the uplink analyzer module 292 may determine if the PCD 100 is proximate to the operator. In this decision block 920, the uplink analyzer module 292 may retrieve data from one or more proximity sensors 199 as described above.

If the inquiry to decision block 920 is positive, then the "YES" branch is followed to block 925. If the inquiry to decision block 920 is negative, then the "NO" branch is followed to sub method or routine 930.

In block 925, the uplink analyzer module sets a flag or variable equal to a value in order to represent that the PCD 100 is proximate to the operator. Once this flag is set, the strength of RF signals produced and an appropriate level of power will be selected by the uplink analyzer module 292 in order to not harm the operator who is adjacent to the PCD 100.

In sub method or routine 930, the uplink analyzer module 292 will determine the volume of data that is intended to be sent over an uplink. The uplink analyzer module 292 will either receive this data directly from an application program 280 or it may use predictive models as described above in connection with FIG. 8.

Next, in sub method or routine 935, the uplink analyzer module 292 will determine the duration of an uplink to be selected. In this sub method or routine 935, the uplink analyzer module 292 will either receive this data directly from an application program 280 or it may use predictive models as described above in connection with FIG. 8.

Subsequently, in sub method or routine 940, the uplink analyzer module will determine the quality of service needed and/or required for the uplink associated with the data to be transmitted. In this sub method or routine 940, the uplink analyzer module will either receive this data directly from the application program 280 or it may use predictive models described above in connection with FIG. 8.

And in sub method or routine 945, the uplink analyzer module 292 will compare one or more alternate airlinks 602 that may be available for an uplink and which may lower the thermal load of the PCD 100 while maintaining a desired quality of service for the data transmission. Sub method or routine 945 generally corresponds to the airlink selection method and steps described above in connection with FIGS. 6A-6B. If the proximity flag was set in block 925, then the uplink analyzer 292 will take proximity to the operator in consideration when it selects an airlink (i.e.—by weighting certain airlinks having less power over other types of airlinks that require more power and stronger RF signals, etc.). The uplink analyzer 292 will generally select airlinks that use less power when the flag was set in block 925 representing that the PCD 100 will be operating in close proximity to the operator.

Next, in block 950, the uplink analyzer module 292 may identify one or more firmly optimal airlinks, data rates, and duration of the one or more airlinks based on the comparison block 945 described above. Exemplary airlinks, include, but are not limited to: Wideband Code-Division Multiple Access ("W-CDMA"); Evolution Data-Only ("EVDO"); Global System for Mobile telecommunications ("GSM") and its data service extensions such as Enhanced Data Rates for GSM Evolution ("EDGE") and General Packet Radio Service ("GPRS"); Long-Term Evolution ("LTE"), wireless fidelity ("Wi-Fi"™) brand of IEEE 802.11 wireless LAN ("WLAN") systems, BLUETOOTH™ brand of proprietary open wireless systems, high speed packet access ("HSPA"), data only ("DO"), one-times radio transmission technology ("1xRTT") or ("1x") or otherwise known as "CDMA 200 1x", ZigBee™ brand IEEE 802 standard personal area networks, and other similar wireless systems. In block 955, the uplink analyzer module 292 may instruct the RRC module 137 to switch to the airlink calculated in block 950.

Subsequently, the application program 280 will transmit its data over the thermally optimal airlink using the data rate and duration calculated in block 950. The method 900 then returns back to block 905.

According to another exemplary embodiment, the airlink selection algorithm may operate in the absence of exceeding any current temperature threshold (such as outlined in block 910 of FIG. 9). Instead, the algorithm may aim to avoid exceeding any temperature thresholds in the future (such thresholds may include, but are not limited to, environmental constraints, like human body temperature, and may not be device specific).

For example, knowing that a volume of bytes of data are to be transmitted ("B"), and having an estimated power output for a first and second airlink 1 and 2 ("P1 and P2"), and two data rates for each airlink characterized as bandwidth ("BW1 and BW2"), the algorithm may calculate that airlink 1 will apply P1 power for B/BW1 duration, reaching a temperature T1 in the process. In contrast, it may be determined that airlink 2 will apply P2 power for B/BW2 duration, reaching temperature T2 in the process. The algorithm may predict T1 and T2 via a simplified device thermal model heat transfer equation. Knowing the ambient/environmental temperature, as power/heat are applied to the PCD 100, device temperature may be elevated towards a steady state. It may turn out that T1 may exceed a desired temperature threshold, while T2 may fall under it, in which case airlink 2 may be selected for the transmission.

Although selected aspects have been illustrated and described in detail, it will be understood that various substitutions and alterations may be made therein without departing from the spirit and scope of the present invention, as defined by the following claims.

What is claimed is:

1. A method for selecting a thermally optimal airlink for a portable computing device, comprising:
   monitoring a temperature of the portable computing device with a processor;
   determining with a processor if the portable computing device has reached a threshold temperature range;
   determining with a processor an estimated volume of data to be sent over two or more airlinks;
   determining with a processor an estimated duration for the data using two or more airlinks;
   determining with a processor a quality of service needed for the data;
   comparing with a processor two or more available airlinks for communicating the data;
   identifying two or more thermally optimal different airlinks with a processor which support communications of the portable computing device and that help reduce thermal output of the portable computing device based on the estimated volume, estimated data rate, and estimated duration; each airlink comprising a different communications protocol relative to another airlink;
   determining with a processor if the portable computing device is proximate to an operator; and
   adjusting output power of a selected airlink with a processor if the portable computing device is proximate to the operator such that the portable computing device radiates at predetermined safe levels relative to the operator.

2. The method of claim 1, further comprising determining if an airlink override condition exists for an application program currently using an existing airlink.

3. The method of claim 1, further comprising switching a current airlink to the identified two or more thermally optimal airlinks, the two or more thermally optimal airlinks lowering a thermal load of the portable computing device while maintaining a desired quality of service for the data.

4. The method of claim 1, wherein at least one of determining an estimated volume of data to be sent over two or more airlinks and determining an estimated duration for the data using two or more airlinks, comprises estimating data based on a predictive model.

5. The method of claim 4, wherein the predictive model comprises a historical prediction method that analyzes historical data from a socket in an application program.

6. The method of claim 1, wherein an airlink comprises at least one of a Wideband Code-Division Multiple Access ("W-CDMA") communication; an Evolution Data-Only ("EVDO") communication; a Global System for Mobile telecommunications ("GSM") communication; an Enhanced Data Rates for GSM Evolution ("EDGE") communication; a General Packet Radio Service ("GPRS") communication; a Long-Term Evolution ("LTE") communication; an IEEE 802.11 wireless LAN ("WLAN") communication; an open wireless system communication; a high speed packet access ("HSPA") communication; a data only ("DO") communication; a one-times radio transmission technology ("1xRTT") or ("1x") or "CDMA 200 1x" communication; and an IEEE 802 standard personal area network communication.

7. The method of claim 1, wherein the portable computing device transmits medical information.

8. The method of claim 1, wherein the portable computing device comprises at least one of a mobile telephone, a personal digital assistant, a pager, a smartphone, a navigation device, a hand-held computer with a wireless connection or link, an a device capable of being embedded in an animal.

9. A computer system for selecting a thermally optimal airlink for a portable computing device, the system comprising:
   a processor operable for:
      monitoring a temperature of the portable computing device;
      determining if the portable computing device has reached a threshold temperature range;
      determining an estimated volume of data to be sent over two or more airlinks;
      determining an estimated duration for the data using two or more airlinks;
      determining a quality of service needed for the data;
      comparing two or more available airlinks for communicating the data;
      identifying two or more thermally optimal different airlinks which support communications of the portable computing device and that help reduce thermal output of the portable computing device based on the estimated volume, estimated data rate, and estimated duration; each airlink comprising a different communications protocol relative to another airlink;
      determining if the portable computing device is proximate to an operator; and
      adjusting output power of a selected airlink if the portable computing device is proximate to the operator such that the portable computing device radiates at predetermined safe levels relative to the operator.

10. The system of claim 9, wherein the processor operable for determining if an airlink override condition exists for an application program currently using an existing airlink.

11. The system of claim 9, wherein the processor operable for switching a current airlink to the identified two or more thermally optimal airlinks, the one or more thermally optimal airlinks lowering a thermal load of the portable computing device while maintaining a desired quality of service for the data.

12. The system of claim 9, wherein the processor being operable for determining an estimated volume of data to be sent over two or more airlinks and for determining an estimated duration for the data using two or more airlinks, further comprises the processor being operable for estimating data based on a predictive model.

13. The system of claim 12, wherein the predictive model comprises a historical prediction method that analyzes historical data from a socket in an application program.

14. The system of claim 9, wherein an airlink comprises at least one of a Wideband Code-Division Multiple Access ("W-CDMA") communication; an Evolution Data-Only ("EVDO") communication; a Global System for Mobile telecommunications ("GSM") communication; an Enhanced Data Rates for GSM Evolution ("EDGE") communication; a General Packet Radio Service ("GPRS") communication; a Long-Term Evolution ("LTE") communication; an IEEE 802.11 wireless LAN ("WLAN") communication; an open wireless system communication; a high speed packet access ("HSPA") communication; a data only ("DO") communication; a one-times radio transmission technology ("1xRTT") or ("1x") or "CDMA 200 1x" communication; and an IEEE 802 standard personal area network communication.

15. The system of claim 9, the processor is further operable for transmitting medical information.

16. The system of claim 9, wherein the portable computing device comprises at least one of a mobile telephone, a personal digital assistant, a pager, a smartphone, a navigation device, a hand-held computer with a wireless connection or link, and a device capable of being embedded in an animal.

17. A computer system selecting a thermally optimal airlink for a portable computing device, the system comprising:
   means for monitoring a temperature of the portable computing device;
   means for determining if the portable computing device has reached a threshold temperature range;
   means for determining an estimated volume of data to be sent over two or more airlinks;
   means for determining an estimated duration for the data using two or more airlinks;
   means for determining a quality of service needed for the data;
   means for comparing two or more available airlinks for communicating the data;
   means for identifying two or more thermally optimal different airlinks which support communications of the portable computing device and that help reduce thermal output of the portable computing device based on the estimated volume, estimated data rate, and estimated duration; each airlink comprising a different communications protocol relative to another airlink;
   means for determining if the portable computing device is proximate to an operator; and
   means for adjusting output power of a selected airlink if the portable computing device is proximate to the operator such that the portable computing device radiates at predetermined safe levels relative to the operator.

18. The system of claim 17, further comprising means for determining if an airlink override condition exists for an application program currently using an existing airlink.

19. The system of claim 17, further comprising means for switching a current airlink to the identified two or more thermally optimal airlinks, the two or more thermally optimal airlinks lowering a thermal load of the portable computing device while maintaining a desired quality of service for the data.

20. The system of claim 17, wherein at least one of the means for determining an estimated volume of data to be sent over two or more airlinks and the means for determining an estimated duration for the data using two or more airlinks, comprises means for estimating data based on a predictive model.

21. The system of claim 20, wherein the predictive model comprises a historical prediction method that analyzes historical data from a socket in an application program.

22. The system of claim 17, wherein an airlink comprises at least one of a Wideband Code-Division Multiple Access ("W-CDMA") communication; an Evolution Data-Only ("EVDO") communication; a Global System for Mobile telecommunications ("GSM") communication; an Enhanced Data Rates for GSM Evolution ("EDGE") communication; a General Packet Radio Service ("GPRS") communication; a Long-Term Evolution ("LTE") communication; an IEEE 802.11 wireless LAN ("WLAN") communication; an open wireless system communication; a high speed packet access ("HSPA") communication; a data only ("DO") communication; a one-times radio transmission technology ("1xRTT") or ("1x") or "CDMA 200 1x" communication; and an IEEE 802 standard personal area network communication.

23. The system of claim 17, further comprising means for transmitting medical information.

24. The system of claim 17, wherein the portable computing device comprises at least one of a mobile telephone, a personal digital assistant, a pager, a smartphone, a navigation device, a hand-held computer with a wireless connection or link, and a device capable of being embedded in an animal.

25. A computer program product comprising a computer usable medium having a computer readable program code embodied therein, said computer readable program code adapted to be executed to implement a method for selecting a thermally optimal airlink for a portable computing device, said method comprising:
   monitoring a temperature of the portable computing device with a processor;
   determining with a processor if the portable computing device has reached a threshold temperature range;
   determining with a processor an estimated volume of data to be sent over two or more airlinks;
   determining with a processor an estimated duration for the data using two or more airlinks;
   determining with a processor a quality of service needed for the data;
   comparing with a processor two or more available airlinks for communicating the data;
   identifying two or more thermally optimal different airlinks with a processor which support communications of the portable computing device and that help reduce thermal output of the portable computing device based on the estimated volume, estimated data rate, and estimated duration; each airlink comprising a different communications protocol relative to another airlink;
   determining with a processor if the portable computing device is proximate to an operator; and
   adjusting output power of a selected airlink with a processor if the portable computing device is proximate to the operator such that the portable computing device radiates at predetermined safe levels relative to the operator.

26. The computer program product of claim 25, wherein the program code implementing the method further comprises:
   determining if an airlink override condition exists for an application program currently using an existing airlink.

27. The computer program product of claim 25, wherein the program code implementing the method further comprises:
   switching a current airlink to the identified two or more thermally optimal airlinks, the two or more thermally optimal airlinks lowering a thermal load of the portable computing device while maintaining a desired quality of service for the data.

28. The computer program product of claim 25, wherein at least one of determining an estimated volume of data to be sent over two or more airlinks and determining an estimated duration for the data using two or more airlinks, comprises estimating data based on a predictive model.

29. The computer program product of claim 25, wherein the predictive model comprises a historical prediction method that analyzes historical data from a socket in an application program.

30. The computer program product of claim 25, wherein an airlink comprises at least one of a Wideband Code-Division Multiple Access ("W-CDMA") communication; an Evolution Data-Only ("EVDO") communication; a Global System for Mobile telecommunications ("GSM") communication; an Enhanced Data Rates for GSM Evolution ("EDGE") communication; a General Packet Radio Service ("GPRS") communication; a Long-Term Evolution ("LTE") communication; an IEEE 802.11 wireless LAN ("WLAN") communication; an open wireless system communication; a high speed packet access ("HSPA") communication; a data only ("DO") communication; a one-times radio transmission technology ("1xRTT") or ("1x") or "CDMA 200 1x" communication; and an IEEE 802 standard personal area network communication.

31. The computer program product of claim 25, wherein the portable computing device transmits medical information.

32. The computer program product of claim 25, wherein the portable computing device comprises at least one of a mobile telephone, a personal digital assistant, a pager, a smartphone, a navigation device, a hand-held computer with a wireless connection or link, and a device capable of being embedded in an animal.

* * * * *